(12) United States Patent
Khaligh et al.

(10) Patent No.: US 11,491,883 B2
(45) Date of Patent: Nov. 8, 2022

(54) VEHICLE ON-BOARD CHARGER FOR BI-DIRECTIONAL CHARGING OF LOW/HIGH VOLTAGE BATTERIES

(71) Applicant: UNIVERSITY OF MARYLAND, COLLEGE PARK, College Park, MD (US)

(72) Inventors: Alireza Khaligh, Arlington, VA (US); Jiangheng Lu, College Park, MD (US); Ayan Mallik, College Park, MD (US); Shenli Zou, College Park, MD (US)

(73) Assignee: University of Maryland, College Park, College Park, MD (US)

( * ) Notice: Subject to any disclaimer, the term of this patent is extended or adjusted under 35 U.S.C. 154(b) by 0 days.

(21) Appl. No.: 15/733,746

(22) PCT Filed: Apr. 10, 2019

(86) PCT No.: PCT/US2019/026779
§ 371 (c)(1),
(2) Date: Oct. 13, 2020

(87) PCT Pub. No.: WO2019/199964
PCT Pub. Date: Oct. 17, 2019

(65) Prior Publication Data
US 2021/0155100 A1   May 27, 2021

Related U.S. Application Data

(60) Provisional application No. 62/655,708, filed on Apr. 10, 2018.

(51) Int. Cl.
*B60L 53/14* (2019.01)
*B60L 58/20* (2019.01)
(Continued)

(52) U.S. Cl.
CPC .............. *B60L 53/14* (2019.02); *B60L 53/62* (2019.02); *B60L 55/00* (2019.02); *B60L 58/20* (2019.02);
(Continued)

(58) Field of Classification Search
CPC .......... B60L 53/14; B60L 58/20; B60L 53/62; B60L 2210/30; B60L 2210/12; B60L 2210/14; B60L 55/00
(Continued)

(56) References Cited

U.S. PATENT DOCUMENTS

| 5,933,338 A | 8/1999 | Wallace |
| 7,560,872 B2 | 7/2009 | Lyle, Jr. et al. |

(Continued)

FOREIGN PATENT DOCUMENTS

WO   2015164970 A1   11/2015

OTHER PUBLICATIONS

International Search Report and Written Opinion for related International Application PCT/US2019/026779, dated Aug. 19, 2019.
(Continued)

*Primary Examiner* — Jack Chiang
*Assistant Examiner* — Brandon Bowers
(74) *Attorney, Agent, or Firm* — Rosenberg, Klein & Lee

(57) ABSTRACT

Compact light-weight on-board three-port power electronic system built in various configurations of triple-active-bridge-derived topologies, including modular implementations, with control strategies capable of bi-directional power transfer among the three ports of the power electronic system, including simultaneous charging of a high voltage (HV) battery and a low voltage (LV) battery from a single phase power grid or a three-phase power grid with minimized reactive power and active circulating current, with
(Continued)

ensured soft-switching for MOSFET devices, and with enhanced synchronous rectification and reduced power losses.

20 Claims, 24 Drawing Sheets

(51) Int. Cl.
 *B60L 53/62* (2019.01)
 *B60L 55/00* (2019.01)
(52) U.S. Cl.
 CPC ....... *B60L 2210/12* (2013.01); *B60L 2210/14* (2013.01); *B60L 2210/30* (2013.01)
(58) Field of Classification Search
 USPC .......................................................... 320/107
 See application file for complete search history.

(56) References Cited

U.S. PATENT DOCUMENTS

| | | | |
|---|---|---|---|
| 7,880,577 B1 | 2/2011 | Glaser et al. | |
| 9,931,951 B2* | 4/2018 | Khaligh et al. | ... H02M 3/33584 |
| 10,122,285 B2 | 11/2018 | Lu et al. | |
| 2012/0040210 A1 | 2/2012 | Hermann | |
| 2014/0103860 A1 | 4/2014 | Kominami et al. | |
| 2016/0016479 A1 | 1/2016 | Khaligh et al. | |
| 2019/0143822 A1 | 5/2019 | Malek et al. | |
| 2021/0399624 A1 | 12/2021 | Brown et al. | |

OTHER PUBLICATIONS

Cho, et al. "High-Efficiency Bidirectional DAB Inverter Using a Novel Hybrid Modulation for Stand-Alone Power Generating System With Low Input Voltage." IEEE Transactions on Power Electronics, vol. 31, No. 6 (Jun. 2016), pp. 1138-1147. Doi: 10.1109/TPEL.2015.2476336.

Diab, et al. "A Nine-Switch-Converter-Based Integrated Motor Drive and Battery Charger System for EVs Using Symmetrical Six-Phase Machines." IEEE Transactions on Industrial Electronics, vol. 63, No. 9 (Sep. 2016), pp. 5326-5335. DOI: 10.1109/TIE.2016.2555295.

Hou & Emadi. "A Primary Full-Integrated Active Filter Auxiliary Power Module in Electrified Vehicles With Single-Phase Onboard Chargers." IEEE Transactions on Power Electronics, vol. 32, No. 11 (Nov. 2017), pp. 8393-8405. DOI: 10.1109/TPEL.2017.2650482.

Koushki, et al. "Review and Comparison of Bi-Directional AC-DC Converters with V2G Capability for On-Board EV and HEV." 2014 IEEE Transportation Electrification Conference and Expo (ITEC) (Jun. 2014), pp. 1-6. DOI: 10.1109/ITEC.2014.6861779.

Lee, et al. "An Isolated/Bidirectional PWM Resonant Conveder for V2G(H) EV on-Board Charger." IEEE Transactions on Vehicular Technology, vol. 66, No. 9 (Sep. 2017), pp. 7741-7750. DOI: 10.1109/TVT.2017.2678532.

Li, et al. "Bi-Directional On-Board Charger Architecture and Control for Achieving Ultra-High Efficiency with Wide Battery Voltage Range." 2017 IEEE Applied Power Electronics Conference and Exposition (APEC) (Mar. 2017), pp. 3688-3694. DOI: 10.1109/APEC.2017.7931228.

Lu & Wang. "Three-Port Bidirectional CLLC Resonant Converter Based Onboard Charger for PEV Hybrid Energy Management System." 2017 IEEE Energy Conversion Congress and Exposition (ECCE) (Oct. 2017), pp. 1432-1438. DOI: 10.1109/ECCE.2017.8095958.

Monteiro, et al. "Improved Vehicle-to-Home (iV2H) Operation Mode: Experimental Analysis of the Electric Vehicle as Off-Line Ups." IEEE Transactions on Smart Grid, vol. 8, No. 6 (Nov. 2017), pp. 2702-2711. DOI: 10.1109/TSG.2016.2535337.

Pinto, et al. "On-Board Reconfigurable Battery Charger for Electric Vehicles With Traction-to-Auxiliary Mode." IEEE Transactions on Vehicular Technology, vol. 63, No. 3 (Mar. 2014), pp. 1104-1116. DOI: 10.1109/TVT.2013.2283531.

Ronanki & Williamson. "Modular Multilevel Converters for Transportation Electrification: Challenges and Opportunities." IEEE Transactions on Transportation Electrification, vol. 4, No. 2 (Jun. 2018), pp. 399-407. DOI: 10.1109/TTE.2018.2792330.

Shi, et al. "A Three-Phase Integrated Onboard Charger for Plug-In Electric Vehicles." IEEE Transactions on Power Electronics, vol. 33, No. 6 (Jun. 2018), pp. 4716-4725. DOI: 10.1109/TPEL.2017.2727398.

Shin & Lee. "An Electrolytic Capacitor-less Bi-directional EV on-board Charger Using Harmonic Modulation Technique." IEEE Transactions on Power Electronics, vol. 29, No. 10 (Oct. 2014), pp. 5195-5203. DOI: 10.1109/TPEL.2013.2293781.

Soeiro, et al. "Swiss Rectifier—A Novel Three-Phase Buck-Type PFC Topology for Electric Vehicle Battery Charging." 2012 Twenty-Seventh Annual IEEE Applied Power Electronics Conference and Exposition (APEC) (Feb. 2012), pp. 2617-2624. DOI: 10.1109/APEC.2012.6166192.

Tang, et al. "An Integrated Dual-Output Isolated Converter for Plug-In Electric Vehicles." IEEE Transactions on Vehicular Technology, vol. 67, No. 2 (Feb. 2018), pp. 966-976. DOI: 10.1109/TVT.2017.2750076.

Tao, et al. "Transformer-Coupled Multiport ZVS Bidirectional DC-DC Converter with Wide Input Range." IEEE Fransactions on Power Electronics, vol. 23, No. 2 (Mar. 2008), pp. 771-781. DOI: 10.1109/TPEL.2007.915129.

Waltrich, et al. "Multiport Converter for Fast Charging of Electrical Vehicle Battery." IEEE Transactions on Industry Applications, vol. 48, No. 6 (Nov.-Dec. 2012), pp. 2129-2139. DOI: 10.1109/TIA.2012.2226694.

Xu, et al. "Hybrid-Bridge-Based DAB Converter With Voltage Match Control for Wide Voltage Conversion Gain Application." IEEE Transactions on Power Electronics, vol. 33, No. 2 (Feb. 2018), pp. 1378-1388. DOI: 10.1109/TPEL.2017.2678524.

Zhao et al.; "An Isolated Three-Port Bidirectional DC-DC Converter With Decoupled Power Flow Management" IEEE Transactions on Power Electronics, vol. 23, No. 5, Sep. 2008; pp. 2443-2453.

\* cited by examiner

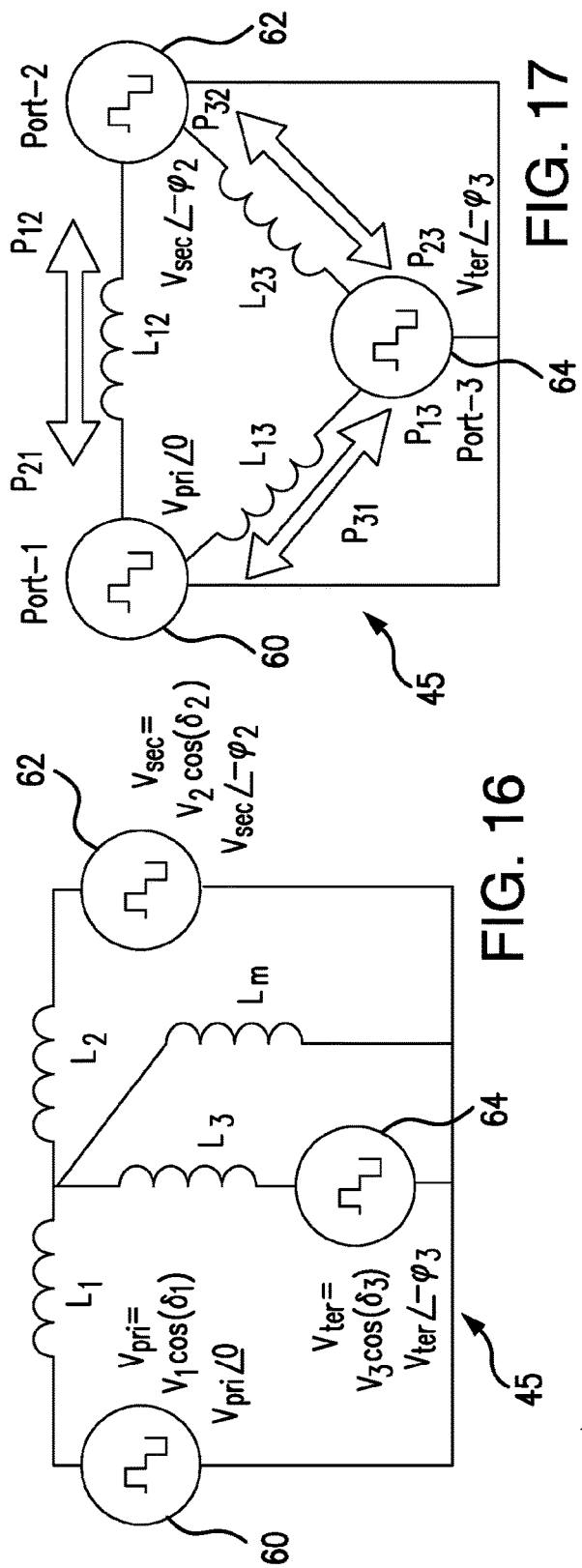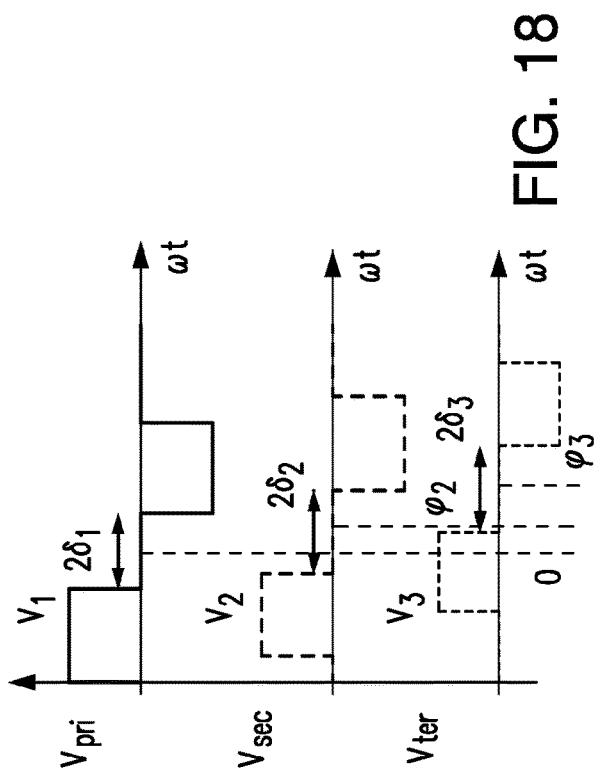
FIG. 16
FIG. 17
FIG. 18

VEHICLE ON-BOARD CHARGER FOR BI-DIRECTIONAL CHARGING OF LOW/HIGH VOLTAGE BATTERIES

STATEMENT REGARDING FEDERAL SPONSORED RESEARCH OR DEVELOPMENT

This invention was made with Government support under IIP 1602012 awarded by the National Science Foundation. The Government has certain rights in the invention.

REFERENCE TO THE RELATED APPLICATIONS

This Utility Application is a National Stage Application of PCT/US2019/026779 filed on 10 Apr. 2019, which is based on the Provisional Patent Application No. 62/655,708 filed on 10 Apr. 2018.

FIELD OF THE INVENTION

The present invention is directed to plug-in electric vehicles (PEVs), and in particular, to on-board chargers (OBCs) for PEVs.

In overall concept, the present invention directs itself to a compact on-board charger for efficient bi-directional charging of both low voltage (LV) battery and high voltage (HV) battery on PEVs.

The present invention is also directed to an integrated on-board charger adapted for a three-phase power grid connection that is capable of a bi-directional operation (from the HV and LV batteries to the grid, from the grid site to the HV and LV batteries, as well as between the HV and LV batteries, and for charging the vehicle (propulsion system) from the grid, as well as discharging the vehicle to the grid.

In addition, the present invention is directed to a compact, highly efficient high power three-phase on-board charger (OBC) system with a modular configuration of the On-board Charger integrated with the Auxiliary Power Module (APM) that is capable of a bi-directional power flow between multiple ports of the OBC.

The present invention is further directed to a three-port power electronic system with one input and two outputs which enables a unique power transfer control methodology simultaneous regulated power transfer towards both output ports from the AC power grid.

The present invention is also directed to the combination of different variations of triple-active bridge (TAB)-derived topologies and control routines which are capable of bi-directional operations among three different ports of the charging system in PEVs.

The present invention is further directed to a power management control strategy in OBCs that is capable of managing bi-directional power flow among three ports (input port and two output ports) of the power electronic system in PEVs at different loading conditions.

In addition, the present invention is directed to an optimization strategy for minimization of the reactive and active circulation of power among different ports of the power electronic system in PEVs, to reduce a peak current stress on MOSFET devices included in the OBC, and to ensure soft switching of all MOSFET devices of the triple-active-bridge (TAB)-based topologies.

The present invention also addresses an analytical predictive model to predict the phase difference between currents in the primary and secondary sides of a transformer to enhance synchronous rectification, to minimize losses in the power electronic system of PEVs, and to overcome a requirement for a high bandwidth secondary side current sensor which is achieved by a predictive model-based synchronous rectification control.

In addition, the present invention addresses a three-port power electronic system for PEVs with one input port and two output ports, capable of simultaneously regulating power transfer with sets of integrated transformers towards both output ports while achieving controlled regulation of output voltages.

Furthermore, the present invention is directed to a three-phase input interface flexible for operation with a single-phase input source, and to a control routine to minimize the circulating power using an approach of a combined phase shift and duty ratio control strategy for the triple-active-bridge (TAB)-based topologies.

In addition, the present invention addresses an OBC capable of achieving a simultaneous charging (G2B) of two batteries (HV and LV) from a grid, grid to HV battery (G2H) charging, grid to LV battery (G2L) charging, HV battery to LV battery (H2L) charging, as well as grid to vehicle (G2V) charging, and vehicle to grid (V2G) discharging.

BACKGROUND OF THE INVENTION

Electric vehicles (EVs) and Plug-In Hybrid Electric Vehicles (PHEVs), commonly referred to herein as Plug-In Electric Vehicles (PEVs), are vehicles propelled by electricity, as opposed to the conventional vehicles which operate on organically based or other liquid/gaseous fuel. The Plug-In Electric Vehicles are composed of an energy storage sub-system (ESS), and an inverter followed by a propulsion machine for electric propulsion called a power train.

There is a trend among industries and researchers to focus on the electrification of transportation, especially in the field of PEVs, due to the environmental issues and the increasing market growth that can be foreseen in the coming decades. According to the report from International Energy Agency, numbers of both electric car stock and electric car sales continually keeps growing.

Electric vehicles (EVs) operate with higher energy conversion efficiency, produce a lower level of exhaust emissions, and lower levels of acoustic noise and vibration, than conventional vehicles. The electricity for electric vehicle operation can be provided either external the vehicle and stored in the ESS, or can be produced on-board with the help of the storage source(s) contained in the ESS.

The battery charger is a device which converts the alternating current (AC) distributed by electric utilities to the direct current (DC) needed to recharge a battery. There are a number of different types of battery chargers based on the way they control the charging rate. Electric vehicle battery chargers may be on-board (residing in the electric vehicle) or off-board (at a fixed location outside the vehicle).

Thus, on-board chargers provide flexibility of battery charging using power outlets. However, on-board chargers contribute to additional weight, volume and cost of the car. Due to their charging power, limitations and slow charging process, it would take between 4-20 hours to fully charge a PEV battery using conventional on-board chargers. Thus, a high power charger which does not need additional bulky on-board or off-board power equipped electronic interfaces, and which would provide faster on-board charging without an additional cost and weight would be highly desirable in the PEVs industry.

Typical on-board chargers include an AC-DC stage for rectification of the AC voltage from the power grid, a Power Factor Correction (PFC), and a DC-DC stage for battery current and voltage regulation.

In the on-board power electronic converter of a PEV, a conventional on-board battery charger operates independent of the propulsion machine and the propulsion inverter. This structural approach is detrimental due to additional or extra components, weight, and cost of the vehicle design. In order to reduce the size, weight and cost of the on-board chargers, different integrated chargers have been designed.

In recent publications, bi-directional on-board charger solutions are sought which not only charge the HV battery from the grid, but also is able to transfer the power from the battery side back to the grid. In addition to the on-board charger, a typical power interface structure for EVs also includes a separate power unit called Auxiliary Power Module (APM) operating to charge the low voltage (LV) battery.

The OBS and APM are two independent battery charger units incorporated in an electric vehicle (EV). The on-board charger (OBC) is the power electronics interface between the power grid and the high voltage (HV) traction battery, and the auxiliary power module (APM) is a separate power unit to charge the low voltage (LV) battery which supply consumer electronics on a vehicle, such as audio, air conditioner, lights, etc.

To reduce charging time and alleviate range anxiety, power ratings of the OBC and battery capacity increase with the help of three-phase power outlets, which are widely used in Europe and Asia. Moreover, many studies have been conducted on bi-directional power flow of OBC, which not only can charge the HV battery from the grid, but also can feed the power from the battery to the grid side.

It would be highly beneficial for PEVs to integrate both units (OBC and APM) together in order to achieve a charger design that would be capable of bi-directional operation with high efficiency, while being smaller in volume, lighter in weight, and less costly compared to those of the existing on-board chargers and auxiliary power modules combined. A compact and highly efficient bi-directional 3-phase charger that would be capable of charging both LV and HV batteries is an attractive solution for the next generation of EVs. Furthermore, this integration will address the preconditioning and depleted LV battery issues in EVs, as there have been many reports/concerns regarding depleted LV batteries in EVs, where a car cannot ever be started, and the LV battery is to be replaced.

There have been numerous attempts to the field of PEVs to integrate an Auxiliary Power Module (APM) into a bi-directional on-board charger (OBC) with different configurations.

One design that integrates the auxiliary power module from the grid side, as shown in FIG. 1, is presented in J. G. Pinto, et al., "Onboard Reconfigurable Battery Charger for Electric Vehicles with Traction-to-Auxiliary Mode", in IEEE Transactions on Vehicular Technology, Vol. 63, No. 3, pp. 1104-1116, March 2014. The topology has two separate bi-directional switches (configured either with relays or back-to-back MOSFET pairs $Q_1$-$Q_2$, $Q_3$-$Q_6$). The configuration permits grid to vehicle (G2V) and vehicle-to-grid (V2G) operation. Disadvantageously, in the grid-to-vehicle charging and vehicle-to-grid discharging modes, there is no isolation between the HV battery and the grid. $Q_5$ and $Q_6$ form a buck converter during the grid-to-vehicle charging and a boost converter in the vehicle-to-grid discharging, which may limit the maximum allowable switching frequency due to the hard-switching.

FIG. 2 depicts a schematic of another configuration of the charger for PEVs with the auxiliary power module connected to the battery at the DC side. This topology (suggested by R. Hou, et al., "A Primary Full-Integrated Active Filter Auxiliary Power Module in Electrified Vehicles with Single-Phase Onboard Chargers", in IEEE Transactions on Power Electronics, vol. 32, no. 11, pp. 8393-8405, November 2017), is similar to the charger equipped with two individual units with the component count being the same as two separate power modules.

Another configuration, depicted in FIG. 3, is presented in X. Lu, et al., "Three-port Bidirectional CLLC Resonant Converter Based Onboard Charger for PEV Hybrid Energy Management System," 2017 IEEE Energy Conversion Congress and Exposition (ECCE), Cincinnati, Ohio, USA, 2017, pp. 1432-1438. This topology integrates the auxiliary power module from DC side. The HV and LV batteries share the same ground. However, no isolation is provided therebetween.

A current doubler rectifier with current ripple cancellation was proposed in J. S. Glaser, et al., "Current doubler rectifier with current ripple cancellation", U.S. Pat. No. 7,880, 577B1, issued Feb. 1, 2011. The circuit utilizes three coupled inductors on the secondary side in an E-core structure. However, disadvantageously, neither the circuit is integrated with any resonant converter, nor the operational principles of the circuit are made applicable to the resonant converter, which makes it inapplicable for LV charging applications.

A rectifying circuit formed with dual current doublers connected in series/parallel was described in K. A. Wallace, "Dual coupled current doubler rectification circuit," U.S. Pat. No. 5,933,338 A, Aug. 3, 1999. This circuit needs separate cores for realizing the secondary inductors and makes the converter significantly bulkier. Also, current ripple cancellation cannot be achieved by this topology, which further will require high output capacitance.

FIG. 4 illustrates an integrated charger topology based on a three-winding integrated transformer, which is disclosed in V. Tang, et al., "An integrated Dual-Output Isolated Converter for Plug-In Electric Vehicles," In IEEE Transactions on vehicular Technology", Vol. 67, No. 2, pp. 966-976, February 2018. This integrated transformer allows integration between a half bridge CLLC resonant converter and a high step-down LLC resonant converter with a full bridge rectifier. The topology is capable of grid-to-vehicle, vehicle-to-grid, and HV-to-LV operations.

Another integrated charger topology shown in FIG. 5 is disclosed in Kominami, et al., "Power Converter and Battery Charger Using the Same", U.S. Patent Application Publication #2014/0103860A1, Apr. 17, 2014, which is a dual active full bridge converter combined with a passive current doubler rectifier, which leaves the LV side output unregulated. Moreover, the control is focused on the noise reduction for the converter rather than on achieving power flow management.

Three-phase on-board chargers have been widely investigated. One integration method of the OBC is to connect an add-on three-phase power electronics interface to the propulsion system, as shown in FIG. 6, and presented in C. Shi, et al., "A Three-Phase Integrated Onboard Charger for Plug-In Electric Vehicles," In IEEE Transactions on Power Electronics, vol. 33, no. 6, pp. 4716-4725, June 2018, where the propulsion motor is used as a coupled DC inductor for the charger. However, the inductor-based integration may negatively affect the longevity of the motor.

FIG. 7 shows a configuration in which the split-winding AC motor structure is utilized for integration (M. S. Diab, et al., "A Nine-Switch-Converter-Based Integrated Motor Drive and Battery Charger System for EVs Using Symmetrical Six-Phase Machines," In IEEE Transactions on Industrial Electronics, vol. 63, no. 9, pp. 5326-5335, September 2016). Disadvantageously, the midpoints of motor windings are not accessible for conventional propulsion system, which needs extra effort for adjustment. This system does not provide isolation, i.e., if a galvanic isolation is mandatory, then either an electric machine with multiple isolated windings or an additional isolated DC-DC stage is required.

To resolve the concern caused by propulsion system integration, some studies have been conducted on multiport integration through a coupled transformer using additional windings. For instance, a three-port dual active full bridge DC/DC converter is proposed in H. Tao, et al., "Transformer-Coupled Multiport ZVS Bidirectional DC-DC Converter with Wide Input Range", In IEEE Transactions on Power Electronics, vol. 23, no. 2, pp. 771-781, March 2008, for fuel cell and supercapacitor applications, which is shown in FIG. 8. By means of the duty ratio and phase shift control, soft-switching is achieved in this configuration with a wide input voltage range of fuel cells. However, this topology is fundamentally for the DC/DC power conversion and is not aimed for the specific charging profile of EV battery, making it inapplicable for high-power integrated OBC applications.

In G. Waltrich, et al., "Multiport Converter for Fast Charging of Electrical Vehicle Battery", in IEEE Transactions on Industry Applications, vol. 48, no. 6, pp. 2129-2139, November-December 2012, a multiport converter is described with a stationary storage port to reduce the required current from the grid for charging station configuration, as shown in FIG. 9. By utilizing the star connections in the secondary of the transformers to eliminate third-order harmonics ripples, a significant reduction in the output filter is granted. However, due to large amounts of switches, complexity of this topology makes it unaffordable for high-power OBC application.

It would be highly desirable to provide a compact OBC free of the shortcomings of the conventional converters, which would be capable of a highly-efficient bi-directional power transfer between the power grid and HV and LV batteries, between HV and LV batteries, and between the grid and the vehicle.

SUMMARY OF THE INVENTION

It is therefore an object of the present invention to provide a compact single-phase and three-phase integrated on-board charger system capable of simultaneous charging of both high voltage (HV) and low voltage (LV) batteries from the power grid and which integrates the functionalities of both the on-board charger (OBC) and the auxiliary power module (APM) to achieve bi-directional operation with high efficiency.

It is another object of the present invention to provide a highly compact, highly efficient bi-directional three-phase on-board charger capable of simultaneous charging both low voltage (LV) and high voltage (I-IV) batteries in the electric vehicles.

It is a further object of the present invention to provide a three-port power electronic system for electric vehicles with one input port and two output ports capable of simultaneous regulated power transfer between the input port and the output ports while maintaining reference voltage levels.

In addition, it is an object of the present invention to provide a unique power flow control methodology for both a single- and three-phase integrated OBC and APM which enables simultaneous charging of HV and LV batteries from the AC grid side in a multi-port on-board charging system for electric vehicles.

It is a further object of the present invention to provide a combination of alternative configurations of triple-active bridge (TAB)-derived topologies and control methods which are capable of bi-directional power flow among the multiple ports of the power electronic system.

Furthermore, it is an object of the present invention to provide a novel control and power management strategy that can manage the bi-directional power flow among three ports at different loading conditions, and an optimization strategy to minimize the reactive and active circulating power among different ports, thus reducing the peak current stress on MOSFET devices.

Further, it is an object of the present invention to ensure soft-switching at the MOSFETs of the triple-active-bridge (TAB)-based topologies of the charging system in EVs applications.

In addition, it is an object of the subject invention to create an analytical model to predict the phase difference between the primary and secondary sides' currents of a charger's transformer to enhance synchronous rectification and to minimize losses, as well as to eliminate the requirement of a high bandwidth secondary side current sensor.

It is still an object of the present invention to provide a charger system for EVs with a three-phase input interface flexible for operation with single-phase input source.

It is also an object of the present invention to provide a control methodology to minimize the circulating power using phase shift and duty ratio combined strategy for the triple-active-bridge (TAB)-based topologies for chargers of PEVs.

In addition, it is an object of the present invention to achieve various functionalities, namely, simultaneous charging (G2B) of HV and LV batteries from a power grid, grid to HV battery (G2H) charging, grid to LV battery (G2L) charging, HV battery to LV battery (H2L) charging, grid to vehicle (G2V) charging, and vehicle to grid (V2G) discharging in the charger in EVs.

In one aspect, the present invention is directed to an on-board charging system for plug-in electric vehicles (PEVs) which includes an on-board charger (OBC) having an input port operatively coupled to an alternative current (AC) power grid, a first output port operatively coupled to a first (HV) battery, and a second output port operatively coupled to a second (LV) battery. The OBC is configured for substantially simultaneous bi-directional power transfer between at least two of the input port, the first output, and the second output ports respectively.

The OBC is further equipped with a power transfer control sub-system integrated in the OBC and operatively coupled to the input and the first and second output ports for bi-directional regulated power transfer therebetween while maintaining reference voltage levels. The control sub-system is configured for a combined phase shift and duty ratio control at the input and the first and second output ports in a resonant-based and a pulse width modulation (PWM)-based modes of operation respectively.

The OBC further includes a transformer sub-system integrated therewith and operatively coupled, by a primary side to the input port, and by secondary and tertiary sides to the first and second output ports, respectively.

A DC/DC converter is integrated in the OBC in operative coupling to the transformer sub-system where the DC/DC converter includes a first converter sub-system operatively coupled between the input port and the primary side of the transformer sub-system, a second converter sub-system operatively coupled between the secondary side of the transformer sub-system and said first output port, and a third converter sub-system operatively coupled between the secondary side of the transformer and the second output port.

The first, second, and third bridge sub-systems, and the transformer sub-system, preferably form a triple active bridge (TAB) converter sub-system.

The OBC is contemplated in numerous embodiments, and may have a configuration selected from a group including a resonant-based configuration and a pulse-width modulation (PWM)-based configuration. Each of the first and second converter sub-systems includes at least two MOSFET devices interconnected to form a half-bridge DC/DC converter circuit, or at least four MOSFET devices interconnected to form a full bridge DC-DC converter circuit. The third converter sub-system includes MOSFET devices interconnected to form a half-bridge DC/DC converter circuit, a full-bridge DC/DC converter circuit, or an active current doubler rectifier circuit.

In the resonance-based configuration, when each of the first and second converter sub-systems includes the half-bridge configuration, the OBC includes a resonant capacitor $C_1$ connected between the first converter sub-system and the primary side of said transformer sub-system, and a resonant capacitor $C_2$ connected between the secondary side of the transformer sub-system and the second converter sub-system.

In the resonance-based configuration, the OBC further includes resonant capacitors $C_1/2$ and $C_2/2$ included in the half-bridge configuration of the first and second converter sub-systems.

In the PWM-based configuration, the DC/DC converter further includes a first shim inductor $L_1$ and a first DC-blocking capacitor $C_1$, each connected between the first converter sub-system and the primary side of the transformer sub-system, a second shim inductor $L_2$, and a second DC-blocking capacitor $C_2$, each connected between the secondary side of the transformer sub-system and the second converter sub-system, and a third inductor $L_3$ interconnected between the secondary side of the transformer sub-system and the third converter sub-system.

The subject on-board charger system, further includes a resonant inductor $L_1$ interconnected between the first converter sub-system and the primary end of the transformer sub-system, and a resonant inductor $L_2$ interconnected between the secondary side of said transformer sub-system and the second converter sub-system with the $L_1$ and $L_2$ enhancing power density of the DC/DC converter.

A switching sub-system controls the power flow during the grid-to-vehicle charging and vehicle-to-grid discharging.

A power interruption device (switch/relay) is connected between the first port and the input converter sub-system between the first converter sub-system and the primary side of the transformer sub-system and at the primary side of the transformer sub-system.

The power transfer control sub-system operates in a mode of operation selected from a group consisting of a simultaneous charging mode of operation, a reactive power flow optimization mode of operation, and a synchronous rectification mode of operation.

In the simultaneous charging mode of operation, the first, second, and third converter sub-systems are configured as full-bridge DC/DC converter circuits, and the power flow towards the first and second output ports and the output voltage levels $V_1$, $V_2$, $V_3$ at the input port, and the first and second output ports, respectively, are controlled by independent control variables including duty rations $\delta_1$, $\delta_2$, $\delta_3$ of the full-bridge DC/DC converter circuits of the first, second and third converter sub-systems and phase angle differences $\varphi_1$ and $\varphi_2$, between fundamental voltage waveforms of the first and second and the first and third converter sub-systems, respectively.

The first converter sub-system includes $Q_1$, $Q_2$, $Q_3$, $Q_4$ MOSFET devices, the second converter sub-system includes $Q_5$, $Q_6$, $Q_7$, $Q_8$ MOSFET devices, and the third converter sub-system includes $Q_9$, $Q_{10}$, $Q_{11}$, $Q_{12}$ MOSFET devices.

In the reactive power flow optimization mode of operation, the subject control sub-system generates the variables $\varphi_2$, $\varphi_3$, $\varphi_3$ sets=0, and determines $\delta$ to ensure a soft switching condition for the MOSFET devices.

In the synchronous rectifier mode of operation, the control sub-system includes a PWM generator supplying a PWMA control signal to the first converter sub-system, a generalized harmonic computational sub-system computing a phase angle difference value $\theta_{SR}$ between the gate pulses for the first and second converter sub-systems required for synchronizing with a zero current crossing of a resonant current in the second converter sub-system, a delay computational sub-system coupled to the generalized harmonic computational sub-system receiving the PWMA signal and the phase difference value $\theta_{SR}$ therefrom, and computing a gate signal PWMB based on the PWMA and $\theta_{SR}$.

The delay computational sub-system supplying the gate signal PWMB to the second converter sub-system attains a synchronous rectification in the second and third converter sub-systems.

A synchronous rectification mechanism is incorporated in the MOSFET devices $Q_5$, $Q_6$, $Q_7$, and $Q_8$ of the second converter sub-system during the grid-to-vehicle charging mode of operation, and in the MOSFET devices $Q_1$, $Q_2$, $Q_3$, and $Q_4$ of the first converter sub-system during the vehicle-to-grid discharging mode of operation.

In another aspect, the present invention is directed to a three-phase on-board charger system for plug-in electric vehicles (PEV), which includes a modular on-board charger (OBC) having an input port coupled to a three-phase power grid and a first and second output ports coupled to an on-board high voltage (HV) battery and an on-board low voltage (LV) battery, respectively. The modular on-board charger includes a plurality of electronic modules interconnected in a one-stage configuration, or a two-stage configuration.

In the two-stage configuration, the on-board charger (OBC) includes a first electronic module operatively coupled between the input port and a DC link, where the first electronic module includes a bi-directional three-phase Power Factor Correction (PFC) rectifier sub-system. A second electronic module operatively is coupled to the DC capacitor $C_{DC}$ of the DC link, where the second electronic module includes a plurality of MOSFET devices interconnected in a bridge sub-system. A third electronic module operatively coupled to the bridge sub-system, where the third electronic module includes an integrated transformer sub-system. A fourth electronic module operatively coupled between the integrated transformer sub-system and the first output port, where the fourth electronic module includes a rectifier sub-system for the HB battery coupled to the fourth electronic module. The OBC further includes a fifth electronic module which is operatively coupled between the integrated transformer sub-system and the second output port, where the fifth electronic module includes a rectifier sub-system for the LV battery coupled to the fifth electronic module.

The subject OBC also includes a control sub-system operatively coupled to the electronic modules to implement a combined phase shift-and-duty ratio-based power flow control for charging the HV and LV batteries from the power AC grid, for the HV battery to the LV battery charging, for charging the PEV from the AC power grid, and discharging the PEV to the AC power grid.

In the one-stage configuration, the on-board charger (OBC) includes a sixth electronic module operatively coupled to the input port, where the sixth electronic module including a single-stage AC/DC converter sub-system with the third electronic module operatively coupled to the sixth electronic module.

The fourth and fifth electronic modules are operatively coupled to the integrated transformer sub-system in the third electronic module, with the HV and LV batteries coupled to the first and second output ports, respectively and the control sub-system operatively coupled to the electronic modules.

In the two-stage configuration, the bi-directional three-phase PFC rectifier of the first electronic module may be selected from a group consisting of: a three phase boost PFC rectifier, a three-phase buck PFC rectifier, a three-phase Vienna-type PFC rectifier, a three single-phase buck PFC rectifier, and a modular multi-level converter, The bridge sub-system in the second electronic module may be selected from a group consisting of: two full bridges connected in parallel, two half bridges connected in parallel, two individual half bridges, two individual full bridges, a three-phase bridge, three full bridges, and three half bridges.

The transformer sub-system in the third electronic module may be selected from a group consisting of: at least two separate transformers, at least two transformer sets with primary windings delta interconnected with capacitors and secondary windings interconnected in series with capacitors, and a single three-phase transformer; and The rectifier sub-system of each of the fourth and fifth electronic modules, respectively, may be selected, depending on the configuration of the transformer sub-system from a group consisting of: at least two half bridges, at least two full bridges, at least two half bridges connected in parallel, and at least two full bridges connected in parallel.

The DC Link may be selected from a group consisting of: a split DC Link, and a non-split DC Link.

In the one-stage configuration, the AC/DC converter of the sixth electronic module may be selected from a group consisting of: three single-phase AC-DC converters connected in parallel, a Matrix-based three-phase AC-DC Triple Active Bridge (TAB) converter, and a SWISS-based TAB converter with split AC capacitors.

The transformer sub-system in the third electronic module may be selected from a group consisting of: at least two separate transformers, three transformers with primary windings delta-interconnected with capacitors and secondary windings serially connected with capacitors, and a single three-phase transformer.

The rectifier sub-system in the fourth and fifth electronic modules, respectively, may be selected from a group consisting of: at least two half bridges, at least two full bridges, at least two half bridges connected in parallel, and at least two full bridges connected in parallel.

The control sub-system executes a pulse frequency modulation (PFM) or pulse width modulation (PWM).

In one embodiment, where the subject OBC system has a split power flow, the two-stage configuration may include a bi-directional three-phase PFC rectifier in the first electronic module, two triple active full bridge converters connected in parallel in the second electronic module integrated with two transformers and six shim inductors of the third electronic module.

In an alternative implementation, the subject OBC system has a split power flow, and further includes a three-phase boost PFC rectifier in the first electronic module, and two single-phase DC/DC converters in each of the fourth and fifth electronic modules, respectively, where each single-phase DC/DC converter is integrated with a respective transformer sub-system in each split power flow.

In another embodiment, the subject OBC system may include a three-phase boost PFC rectifier in the first electronic module, and an integrated three-phase DC-DC converter in each of the fourth and fifth electronic modules; or a three single-phase H-bridge PFC rectifiers in the first electronic module integrated with triple active bridge (TAB) converters coupled in parallel.

These and other objects and advantages of the present invention will be more apparent when considered in conjunction with the Drawings and the Detailed Description of the Preferred Embodiment(s).

BRIEF DESCRIPTION OF THE DRAWINGS

FIG. 16 is representative of the integrated DC/DC conversion stage of the subject on-board charger for an electric vehicle;

FIG. 17 is representative of the Delta-equivalent of the star connected network shown in FIG. 16;

FIG. 18 is a diagram representative of the three-level bridge voltage waveforms on the primary, secondary, and tertiary sides of the subject OBC;

DETAILED DESCRIPTION

Figure 1:
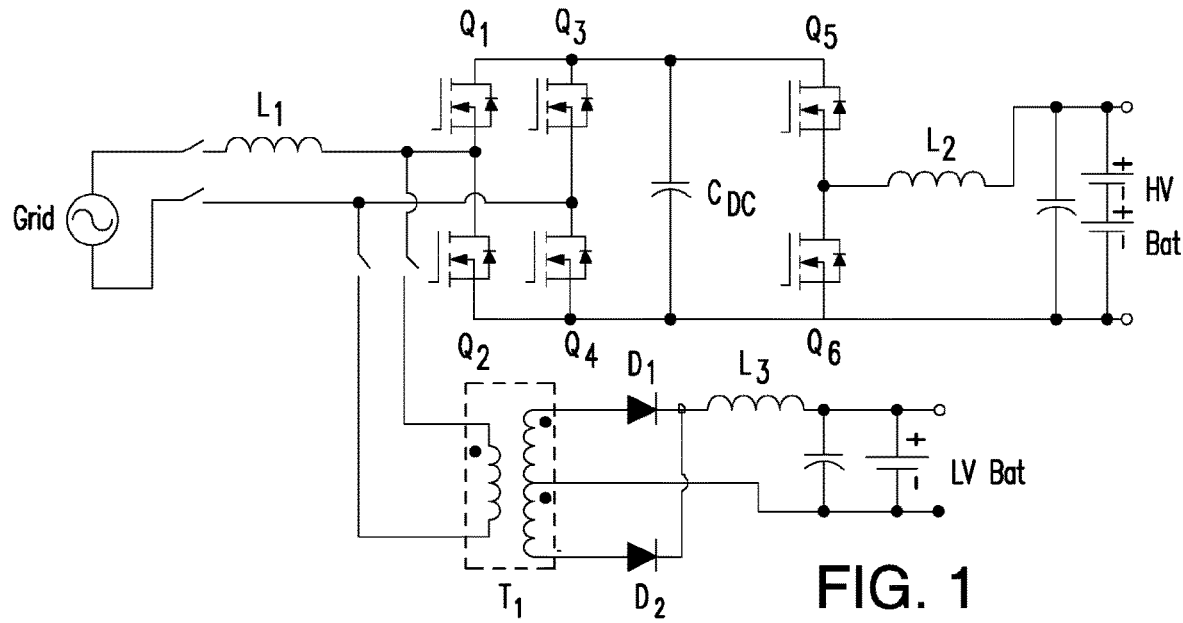
FIG. 1 is a schematic diagram of a prior art integrated configuration of the on-board reconfigurable battery charger for electric vehicles.
Figure 2:
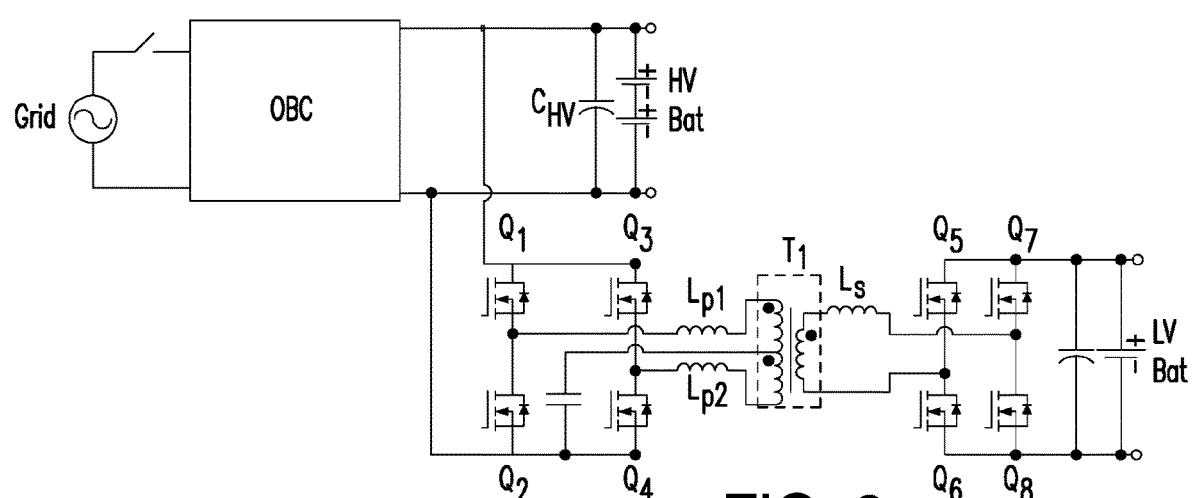
FIG. 2 is a schematic diagram of the prior art charger with the auxiliary power module connected to the battery at the DC side.
Figure 3:
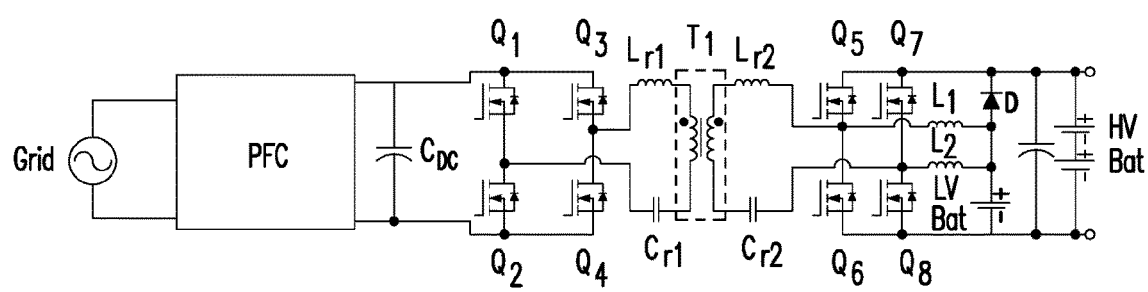
FIG. 3 is a schematic diagram of a prior art charger for PEV hybrid energy management system which integrates the auxiliary power module at the DC side.
Figure 4:
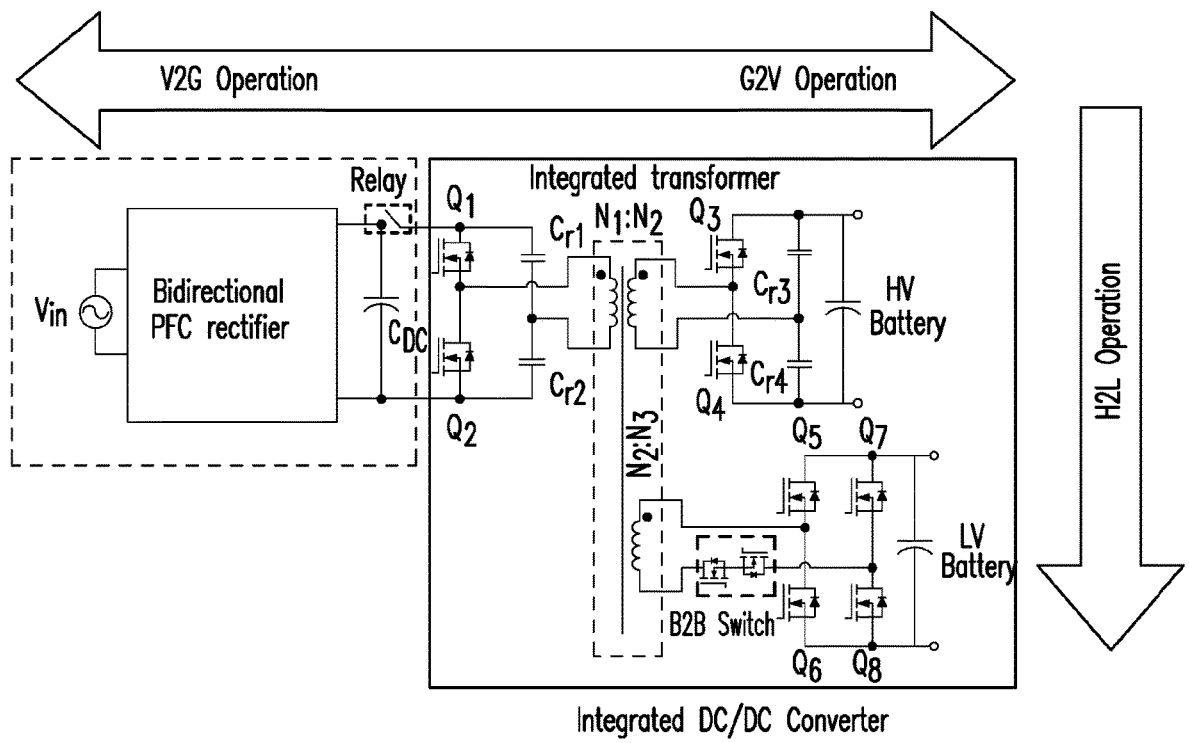
FIG. 4 is a schematic diagram of a prior art three-winding transformer-based integrated OBC with a half-bridge CLLC resonant converter and LLC resonant converter.
Figure 5:
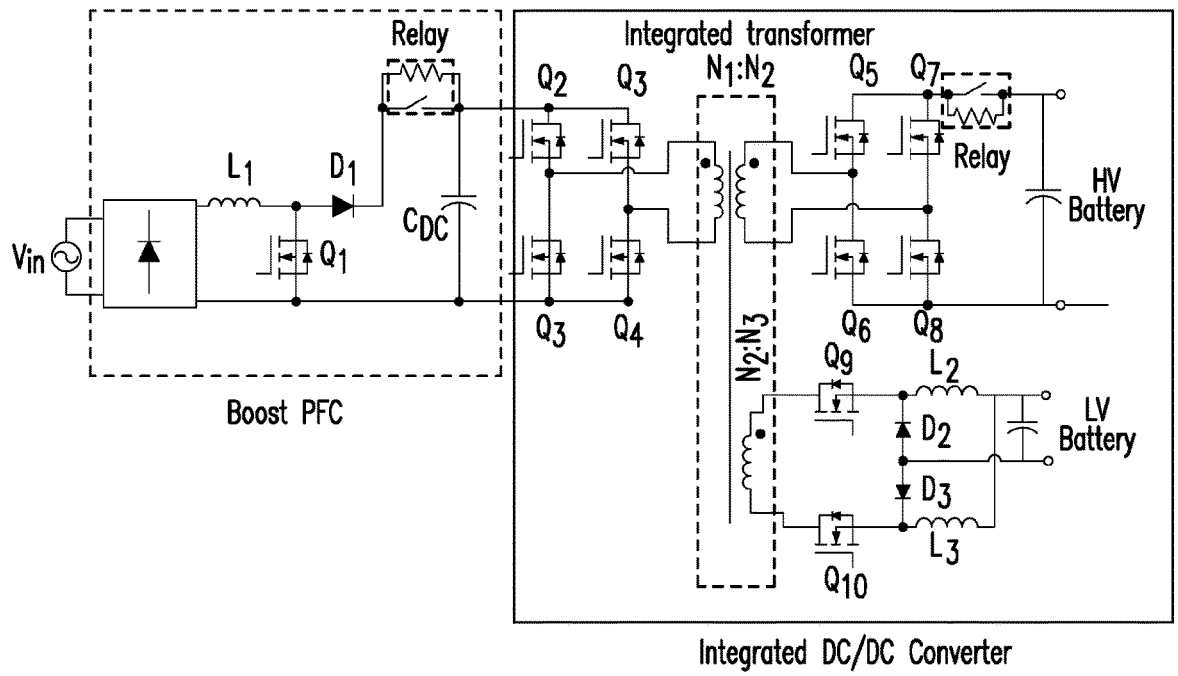
FIG. 5 depicts a schematic of a prior art 3-winding transformer-based integrated onboard charger topology with a dual active bridge converter and a passive current doubler.
Figure 6:
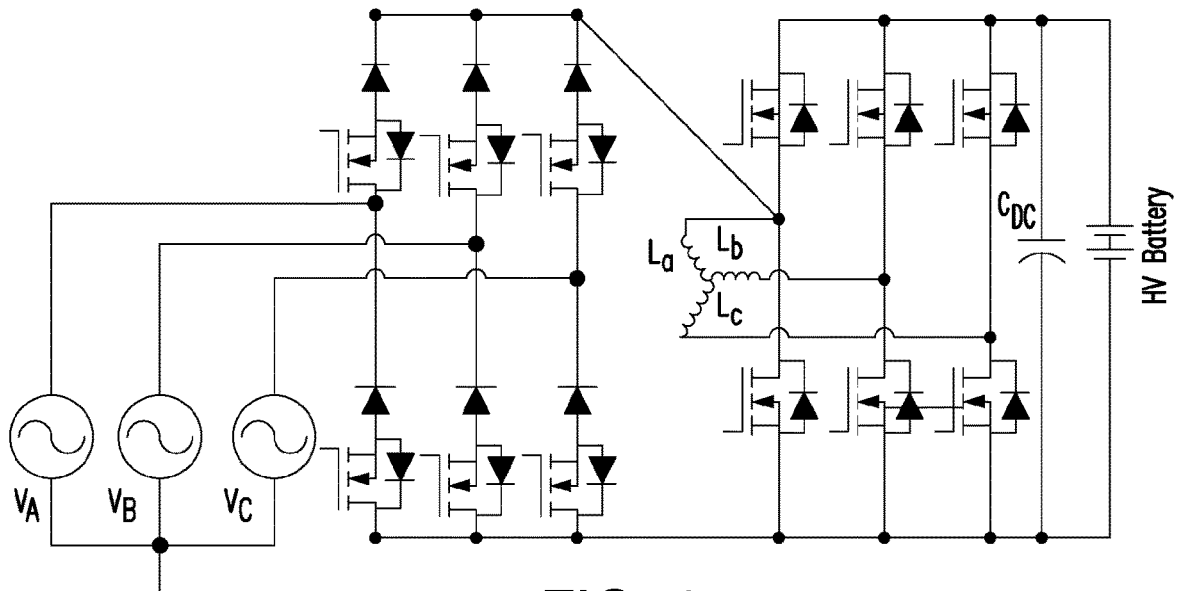
FIG. 6 is a prior art integrated configuration of the on-board charger where a propulsion is used as a coupled DC inductor for the charger.
Figure 7:
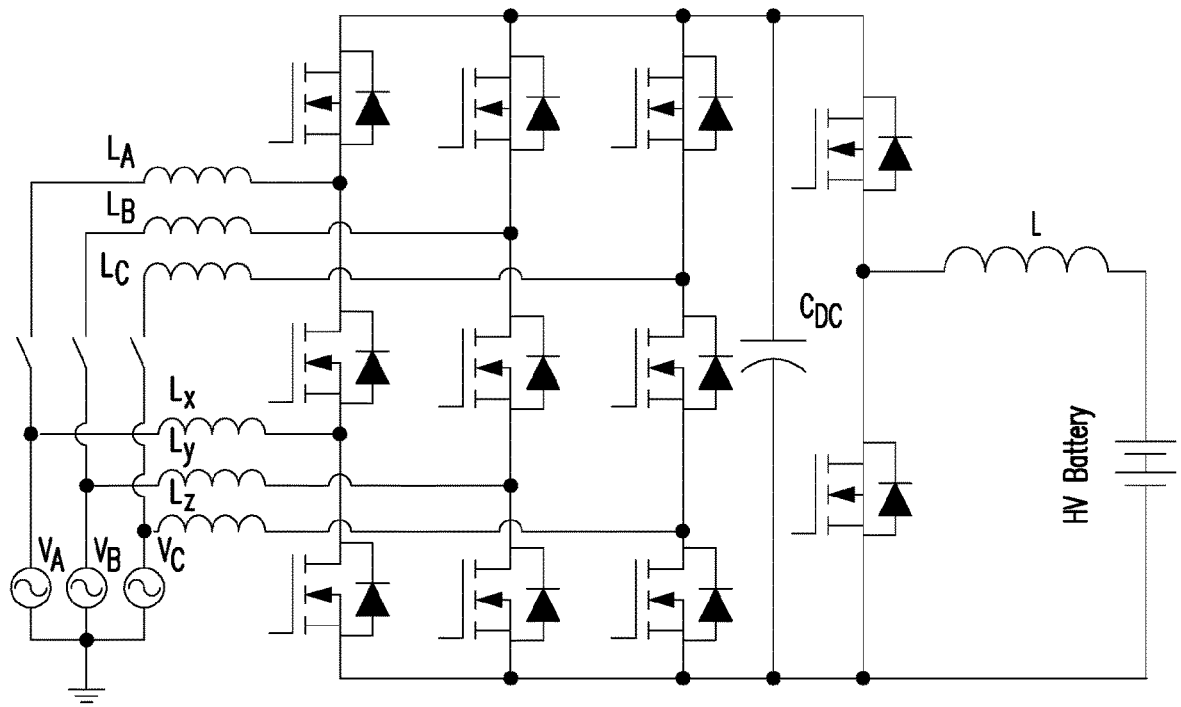
FIG. 7 depicts a prior art configuration in which the split-winding AC motor structure is utilized for integration.
Figure 8:
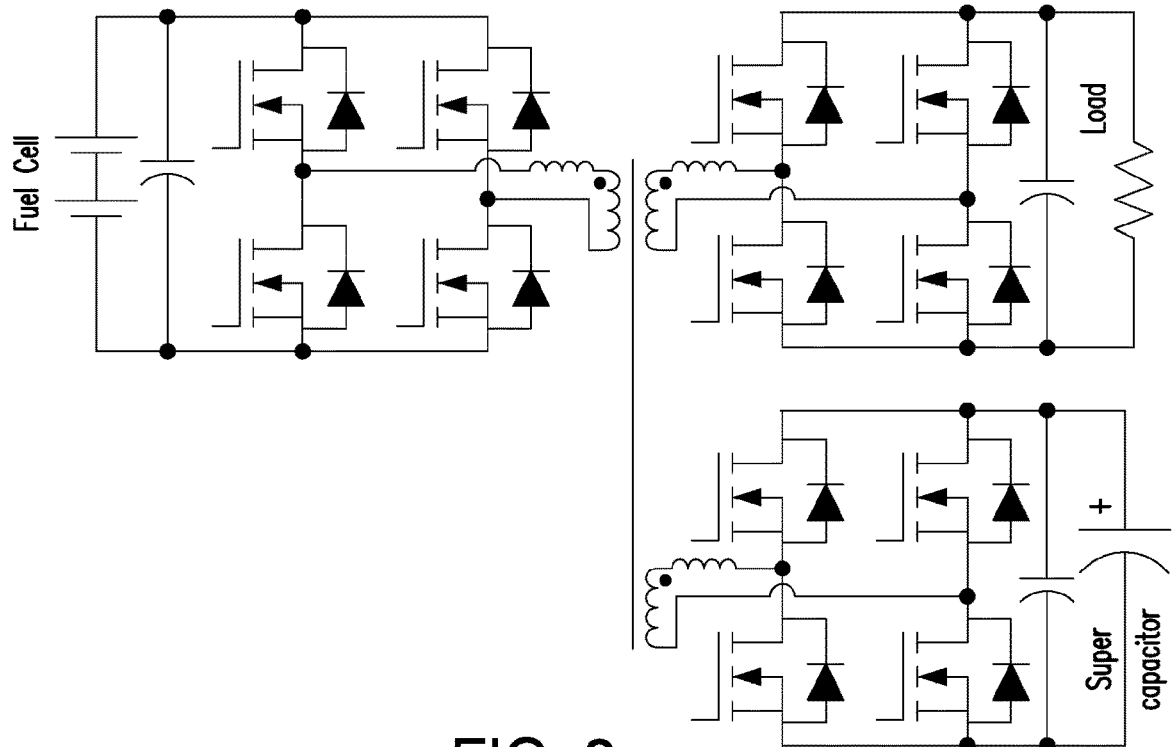
FIG. 8 is a prior art multi-port integrated DC/DC converter with a coupled transformer structure using additional windings.
Figure 9:
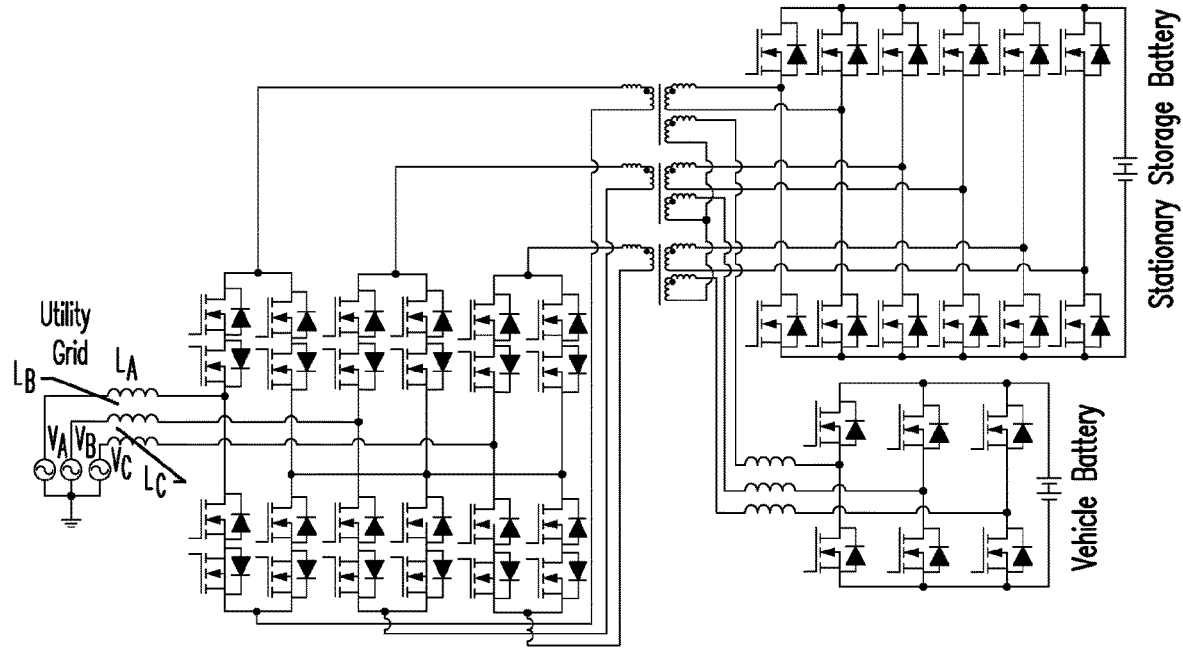
FIG. 9 is a prior art multi-port converter with a stationary storage port which utilizes the star connection in the secondary of transformers to eliminate third-order harmonics ripples.

Referring to FIGS. 10-38 the subject on-board charger system 10, includes an on-board charger (OBC) 12, also referred to herein as an on-board charging DC/DC converter, and an integrated transformer sub-system 14. The OBC 12 also includes a bi-directional PFC (power factor correction) rectifier 16 through which the on-board charger system 10 is connected to the power grid 18.

The PFC rectifier 16 is included in an alternative current (AC) side 17 of the OBC system 10, while the integrated transformer 14 and the DC/DC converter 12, are included in a direct current (DC) side 19 of the OBC system 10. The AC side 17 and the DC side 19 are interconnected through a DC link 21 having a DC link capacitor $C_{DC}$.

Figure 10:
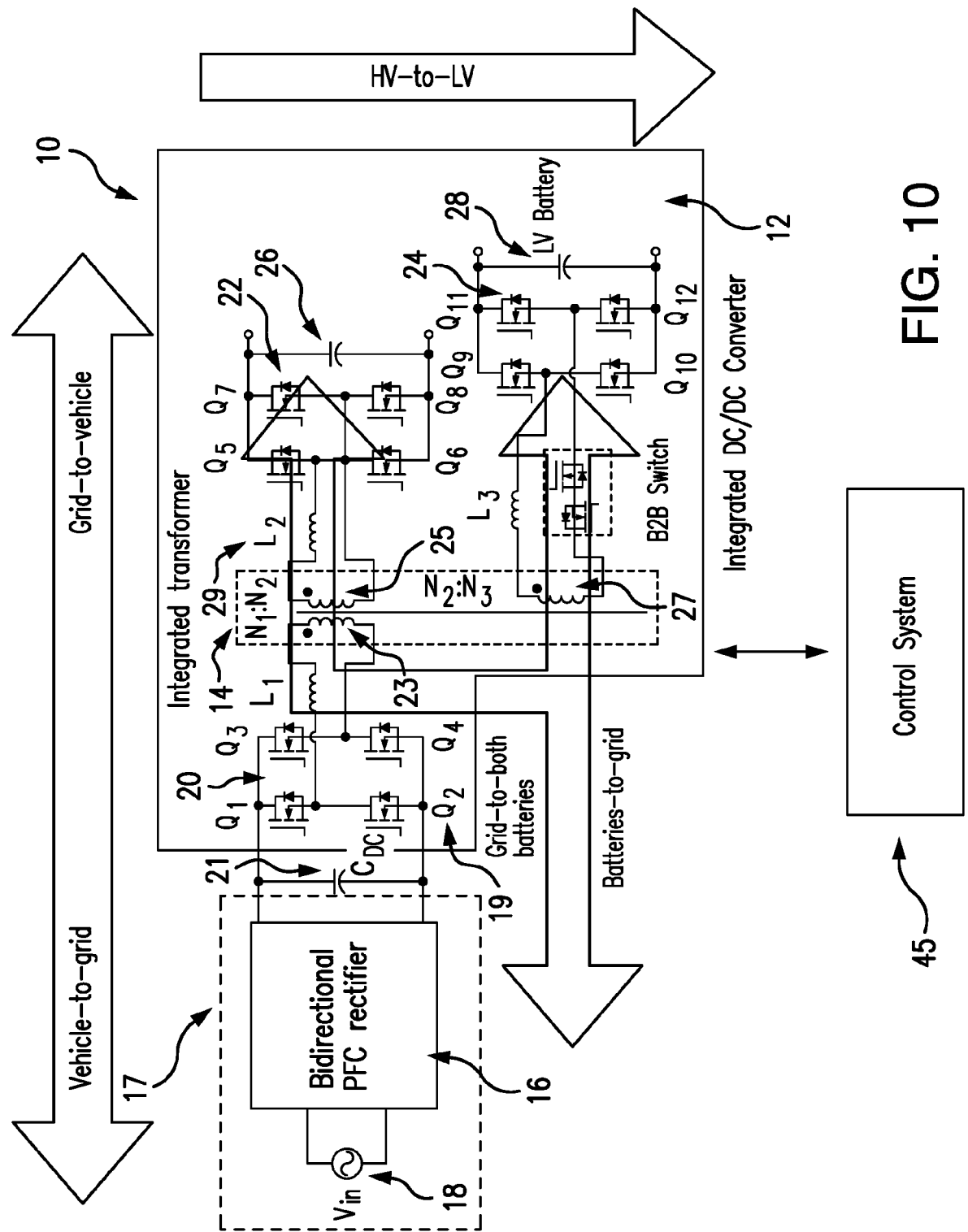
FIG. 10 is a schematic diagram of the subject on-board charger (OBC) for an electric vehicle (EV)

The transformer sub-system 14 includes, in the implementation shown in FIG. 10, a primary winding 23, a secondary winding 25, and a secondary winding 27 (also referred to herein as a tertiary winding) at the tertiary side 36 of the OBC (DC/DC converter) 12.

In the topology shown in FIG. 10, the DC side 19 is configured with MOSFET devices interconnected to form three H-bridges sub-systems 20, 22, 24, three shim inductors (also acting as power transfer inductors) $L_1$, $L_2$ and $L_3$, and two DC-blocking capacitors $C_1$ and $C_2$, which, in combination, form a triple active bridge (TAB) structure 29.

Topology wise, the inductors $L_1$, $L_2$ and $L_3$ provide sufficient inductive energy to achieve zero-voltage-switching for MOSFETs $Q_1$-$Q_4$ (in the bridge sub-system 22), $Q_5$-$Q_8$ (in the bridge sub-system 20), and $Q_9$-$Q_{11}$ (in the bridge sub-system 24), respectively. The inductors $L_1$, $L_2$, and $L_3$ can be achieved by the leakage inductance of the transformer sub-system 14 to further enhance the power density of the DC/DC converter 12.

The capacitors $C_1$ and $C_2$ serve the purpose of blocking the DC component in the current in different operating modes. The DC component of current arises from different mechanisms, such as: (a) asymmetrical pulse width modulation, (b) parasitic imbalance of the devices, and (c) start-up load transients of the DC/DC converter 12.

A unique control methodology is implemented with the topology shown in FIG. 10, which will be detailed in the following paragraphs. With the innovative and unique control, the topology of the subject OBC system 10 shown in FIG. 10 is able to achieve the power flow in different directions. In fact, in addition to the grid-to-vehicle (G2V), vehicle-to-grid (V2G) and HV-to-LV operations (H2L), the system shown in FIG. 10 can provide a unique grid to both HV and LV batteries operation, i.e. is capable of simultaneously charging both HV and LV batteries, with minimized reactive power and circulating current.

There are various topological alternative implementations of the subject system are contemplated which are applicable in simultaneous charging of the HV battery 26 and LV battery 28, as well as the bi-directional power flow in a three-port network system with the subject power transfer control strategy, detailed in further paragraphs.

There are primarily two categories of alternative embodiments of the subject system 10, including: a) Resonant-based topologies, and b) Pulse width modulation (PWM)-based topologies.

Figure 11:
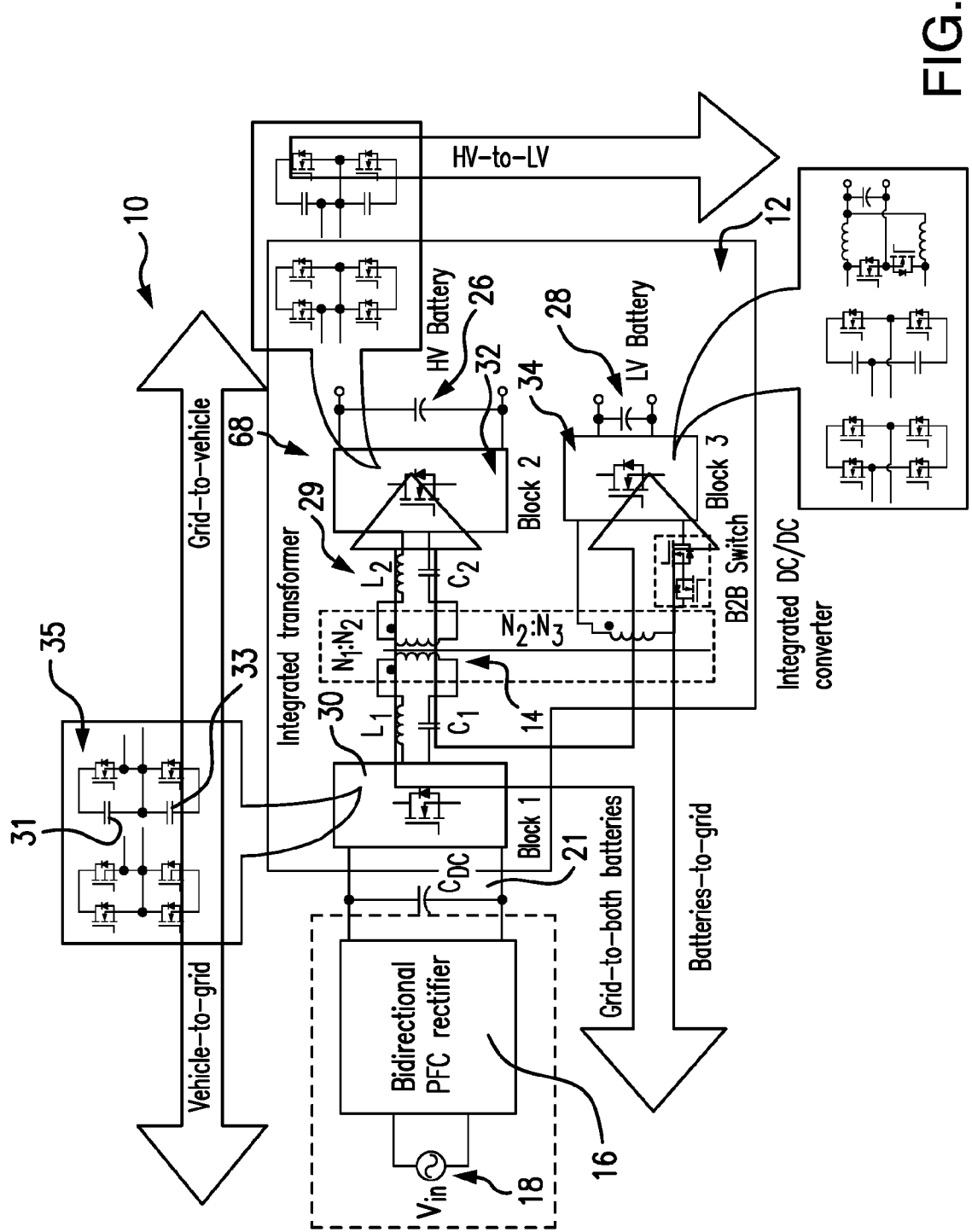
FIG. 11 is a block diagram for the subject resonant based topology of the on-board charger for an electric vehicle.

Resonant-based topologies are depicted in FIG. 11, where the charger sub-system (Block 1) 30 and the charger sub-system (Block 2) 32 have either a half bridge or a full bridge configuration. The charger sub-system (Block 3) 34 includes MOSFET devices and/or capacitors, as well as inductances, interconnected to form either a half bridge or a full bridge configuration. The charger sub-system (Block 3) 34 can be a half bridge, a full bridge, or an active current doubler rectifier.

In the circuitry shown in FIG. 11, $C_1$ and $C_2$ are the resonant capacitors. When the half bridge configuration is selected for either of the charger sub-systems 30 or 32, there are two options, when the $C_1$ and $C_2$ serve as resonant capacitors, or when $C_1$ and $C_2$ can be removed from the circuit, while the capacitors 31, 33 in the half bridge 35 are selected to be resonant capacitors with the capacitance of $C_1/2$ or $C_2/2$.

The resonant inductors $L_1$ and $L_2$ can be realized by the leakage inductances from the transformer sub-system 14 to further enhance the power density of the DC/DC converter 12.

The resonant based topological variations are summarized in Table. I. It is noted that not every variation is capable of grid-to-both batteries (G2B) operation, which will be detailed in further paragraphs.

Figure 12:
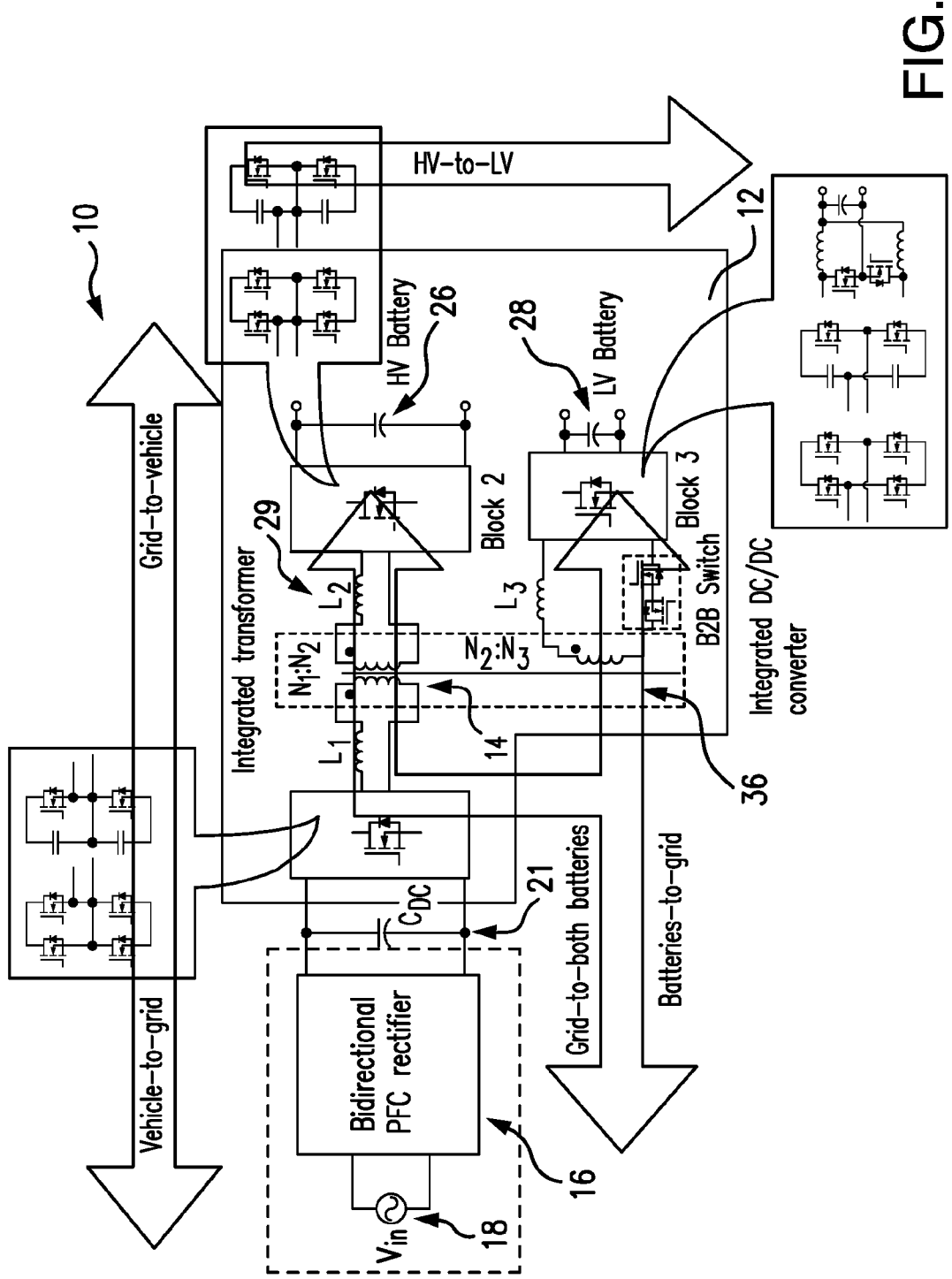
FIG. 12 is a block diagram for pulse widths modulation-based topology for the subject on-board charger for an electric vehicle.

Pulse width modulation based topological alternative implementations are presented in FIG. 12. Compared with the configuration shown in FIG. 11, the topology presented in FIG. 12 has an additional inductor $L_3$ at the tertiary side 36.

The capacitors $C_1$ and $C_2$ function as the DC-blocking capacitors, inductances $L_1$, $L_2$ and $L_3$ are shim inductors functioning to provide the inductive energy for the zero-voltage-switching of the MOSFET devices in the charger sub-systems 30, 32, 34, also referred to herein as Block 1, Block, Block 3, respectively. Similarly, the inductors $L_1$, $L_2$ and $L_3$ can be realized by the leakage inductances of the transformer sub-system 14 to further improve the power density of the DC/DC converter 12.

In the circuit configuration shown in FIG. 12, Block 2 (charger sub-system 32) can be either a half bridge or a full bridge. The block 3 (sub-system 34) can be a half bridge, a full bridge, or an active current doubler rectifier. Different combinations of the alternative implementations contemplated in the subject system result in different topologies.

For instance, a triple-active-bridge (TAB) converter, shown as FIG. 10 can be implemented by selecting a full bridge for all the Blocks 1, 2, 3 (charger sub-systems 30, 32 and 34).

Figure 13:
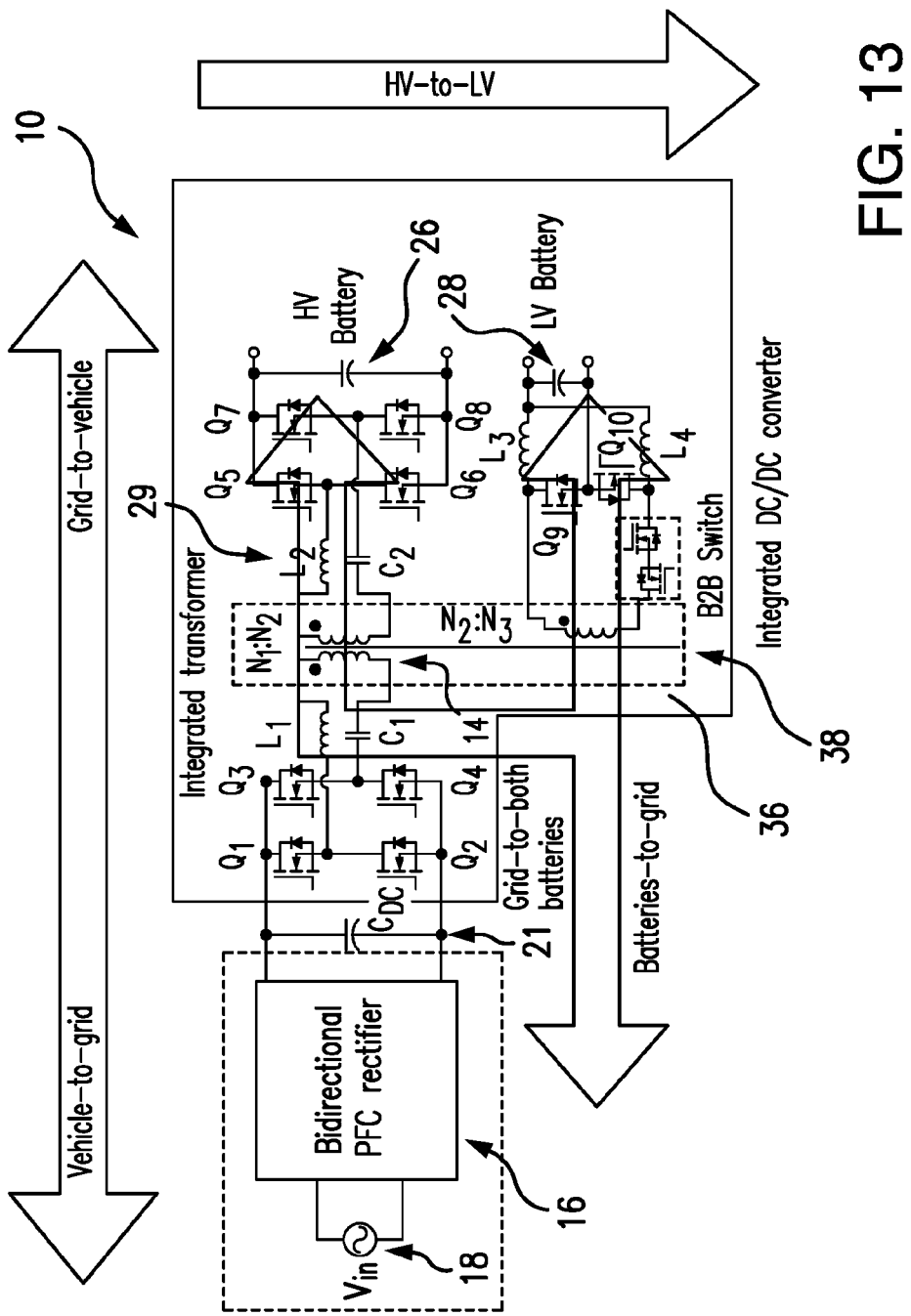
FIG. 13 is a block diagram of the subject on-board charger for electric vehicles which uses dual active bridge converter combined with a tertiary active current doubler rectifier.

In the pulse width modulation-based implementation, shown in FIG. 13, one of the implementations uses a dual active bridge converter combined with the tertiary active current doubler rectifier 38 which operates to control the power flow and to enable the power flow management with multiple directions, i.e. grid-to-vehicle (G2V), vehicle-to-grid (V2G), HV-to-LV (H2L), and grid-to-Both (G2LH) batteries operations.

The pulse width modulation-based implementations of the subject system 10 contemplated in the subject system 10, are summarized as Table II. Not every alternative embodiment is capable of grid-to-both batteries operation, as will be detailed in further paragraphs.

TABLE I

Summary of resonant based topological variations to the invention

| | Block 1 | Block 2 | Block 3 | Resulted topology | G2B capability |
|---|---|---|---|---|---|
| 1 | Full bridge | Full bridge | Full bridge | Variation 1 | Yes |
| 2 | Full bridge | Full bridge | Active current doubler | Variation 2 | Yes |
| 3 | Full bridge | Full bridge | Half bridge | Variation 3 | No |
| 4 | Full bridge | Half bridge | Full bridge | Variation 4 | No |
| 5 | Full bridge | Half bridge | Half bridge | Variation 5 | No |
| 6 | Full bridge | Half bridge | Active current doubler | Variation 6 | No |
| 7 | Half bridge | Full bridge | Full bridge | Variation 7 | No |
| 8 | Half bridge | Full bridge | Half bridge | Variation 8 | No |
| 9 | Half bridge | Full bridge | Active current doubler | Variation 9 | No |
| 10 | Half bridge | Half bridge | Full bridge | Variation 10 | No |
| 11 | Half bridge | Half bridge | Half bridge | Variation 11 | No |
| 12 | Half bridge | Half bridge | Active current doubler | Variation 12 | No |

TABLE II

Summary of pulse width modulation based topological embodiments of the subject system

| | Block 1 | Block 2 | Block 3 | Resulted topology | G2B capability |
|---|---|---|---|---|---|
| 1 | Full bridge | Full bridge | Full bridge | Subject System (FIG. 10) | Yes |
| 2 | Full bridge | Full bridge | Active current doubler | Variation 1 (FIG. 13) | Yes |
| 3 | Full bridge | Full bridge | Half bridge | Variation 2 | No |
| 4 | Full bridge | Half bridge | Full bridge | Variation 3 | No |
| 5 | Full bridge | Half bridge | Half bridge | Variation 4 | No |
| 6 | Full bridge | Half bridge | Active current doubler | Variation 5 | No |
| 7 | Half bridge | Full bridge | Full bridge | Variation 6 | No |
| 8 | Half bridge | Full bridge | Half bridge | Variation 7 | No |
| 9 | Half bridge | Full bridge | Active current doubler | Variation 8 | No |
| 10 | Half bridge | Half bridge | Full bridge | Variation 9 | No |
| 11 | Half bridge | Half bridge | Half bridge | Variation 10 | No |
| 12 | Half bridge | Half bridge | Active current doubler | Variation 11 | No |

Figure 14:
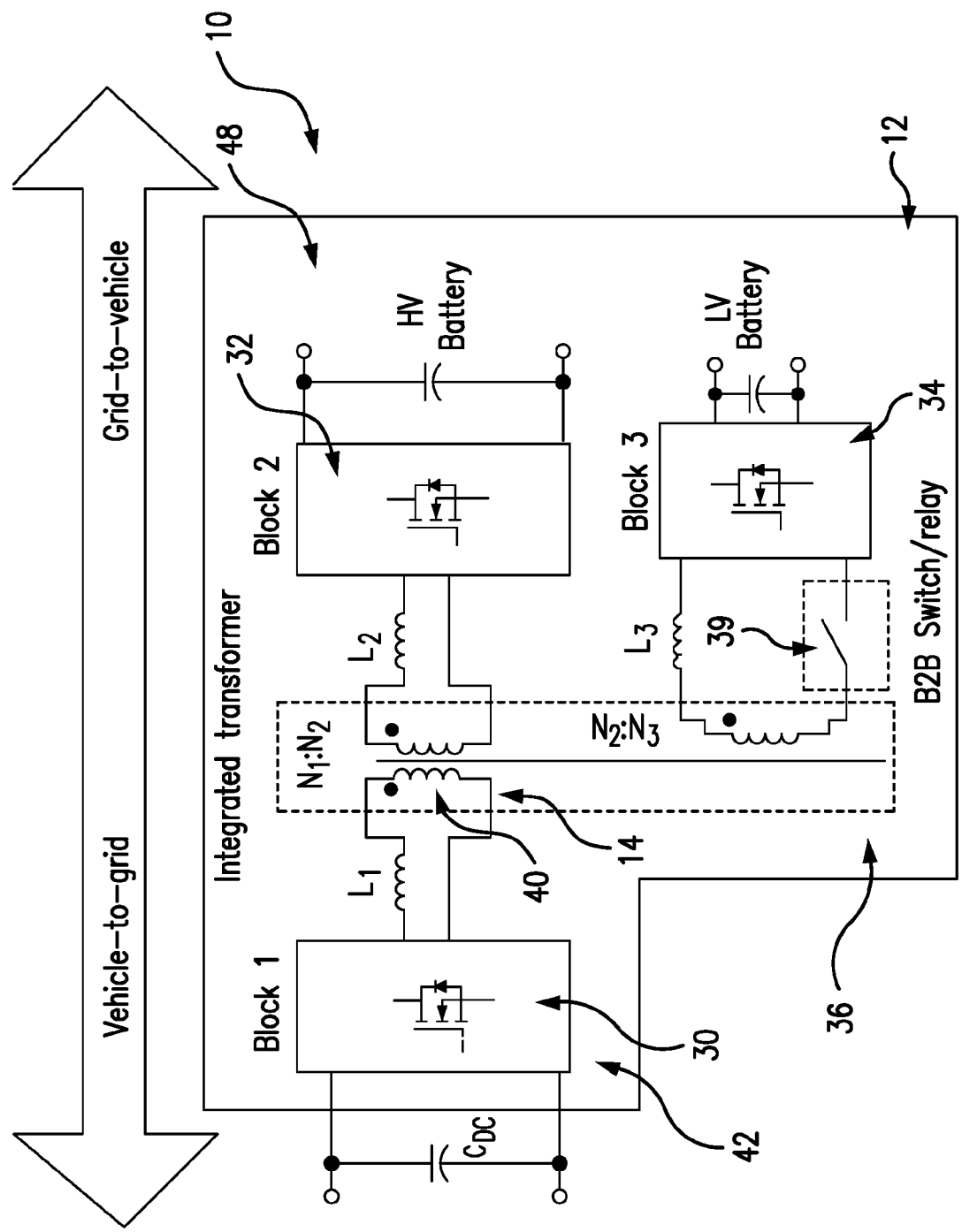
FIG. 14 is a block diagram of the subject on-board charger for electric vehicles using a dash tertiary side back-to-back (B2B) switch.
Figure 15:
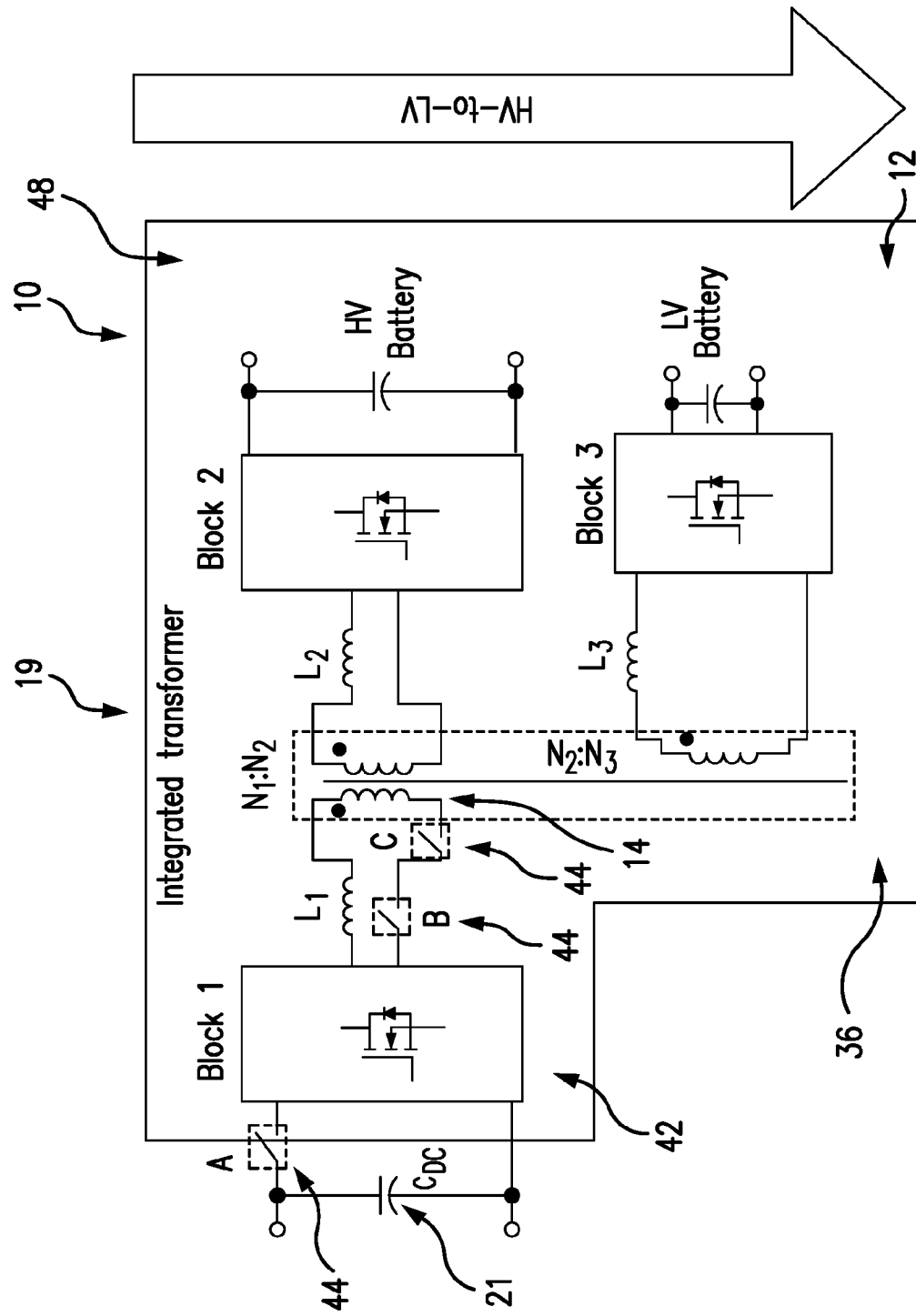
FIG. 15 is a block diagram of the subject on-board charger for electric vehicles with a primary side back-to-back (B2B) switch/relay installation.
Figure 19:
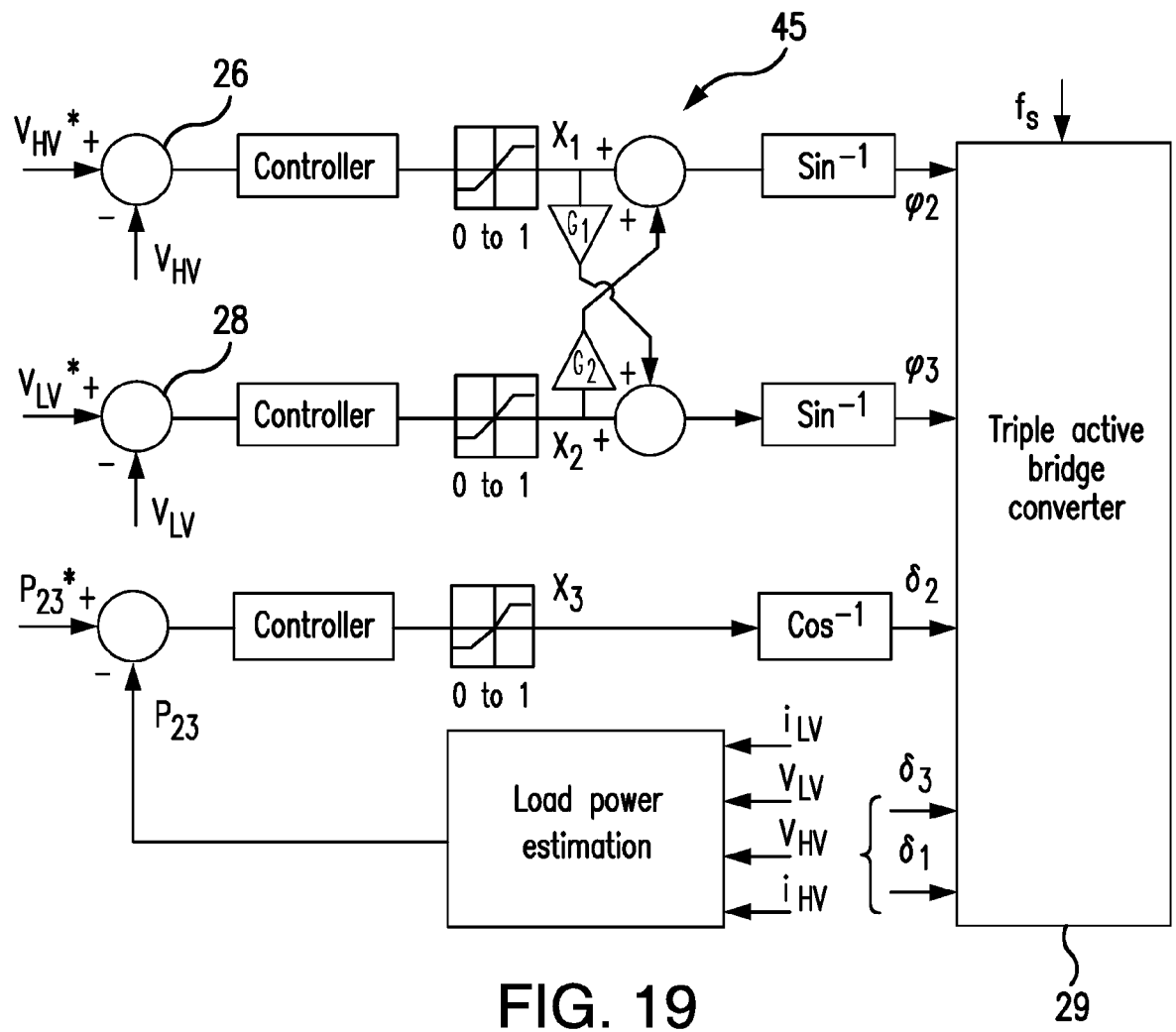
FIG. 19 is the block diagram of the subject control methodology with three-loop structure for controlling three reference variable for the Triple Active Bridge (TAB) converter.

The alternative topologies contemplated in the subject OBC system 10 also may include back-to-back (B2B) switches/relays 39. As shown in FIG. 14, a back-to-back switches (or relay) 39 are needed at the tertiary side 36 of the DC/DC converter 12 to cut the power flow during the grid-to-vehicle (G2V) charging or vehicle-to-grid (V2G) discharging operations. Otherwise, when the voltage of the LV battery 28 is lower than the voltage of the HV battery 26, the power flow towards LV battery 28 cannot be zero even with all tertiary side MOSFETs (in Block 3) turned off. Moreover, during HV-to-LV (H2L) power flow operation, the reflected voltage on the primary winding 40 of the transformer sub-system 14 may have an excessive peak value, which may cause the failure of the voltage on the DC link 21 and on the MOSFETs in the Block 1 on the primary side 42. To prevent such failure, a relay (or back-to-back switch) 44 can be implemented at points A, B or C, as shown in FIG. 15.

During the HV-to-LV (H2L) power flow, the back-to-back switch/relay(s) 44 can be turned off to break the electrical connections between the active part (DC/DC converter 12) of the circuit and the primary side circuit (Block 1). It is noted that for both topologies shown in FIGS. 14-15, the inductor $L_3$ at the tertiary side 36 is included in the circuitry only for the pulse width modulation-based embodiments.

Power Flow Control Methodology for Single-Phase and Three-Phase Integrated OBC and APM (a) Simultaneous Charging The control system 45 implemented in the subject charger system 10 is capable of charging two energy storage sources (HV battery, LV battery) 26, 28 from another source, which may be the power system AC grid 18. In addition, the control system 45 has the flexibility for grid-to-vehicle (G2V), vehicle-to-grid (V2G), and HV-to-LV (H2L) operations. Charging can be performed within a wide range of operating conditions of 85 V-265 V single-phase AC, 100 V-1000 V for HV battery, and 8 V-28 V for LV battery.

The integrated DC/DC conversion stage of the subject converter architecture, as shown in FIG. 16, is a three-port network including one input port 60 and two output ports 62, 64. The primary, secondary and tertiary bridge voltages $V_{pri}$, $V_{sec}$, $V_{ter}$, respectively, are bipolar quasi-square waves, respectively, with mutual phase shifts. Since the magnetizing inductance of the transformer sub-system 14 is much greater than the leakage inductance, it can be ignored in the equivalent circuit without any loss in generality.

FIG. 17 represents the delta-equivalent of the star connected network shown in FIG. 16, which is a more convenient model for establishing power flow expressions. The equivalent delta inductances are expressed by $$L_{12} = L_1 + L_2 + \frac{L_1 L_2}{L_3}; \quad \text{(Eq. 1)}$$

$$L_{13} = L_1 + L_3 + \frac{L_1 L_3}{L_2}; \quad \text{(Eq. 2)}$$

$$L_{23} = L_2 + L_3 + \frac{L_2 L_3}{L_1}. \quad \text{(Eq. 3)}$$

In the model shown in FIGS. 16-17, the voltages $V_1$, $V_2$, $V_3$ ($V_{pri}$, $V_{sec}$, $V_{ter}$) are the reflected amplitudes of the input DC voltage to the DC/DC stage, the HV battery, and the LV battery on the primary side of the transformer, respectively.

The dual-output triple active bridge (TAB) cannot be treated as two independent dual active bridge converters due to the unavoidable power flow between Port-2 and Port-3, shown in FIG. 17.

In order to control the power flow towards the two output ports 62, 64, as well as to regulate the output voltage levels, the subject control system 45 uses up to five independent control variables, i.e. three duty ratios ($\delta_1$, $\delta_2$, $\delta_3$) of three full-bridges (primary, secondary and tertiary) incorporated in Blocks 1, 2, 3 shown in FIG. 15, and the phase angle differences $\varphi_2$ and $\varphi_3$ between the primary-secondary and primary-tertiary fundamental bridge voltage waveforms, respectively, as shown in FIG. 17. Based on the subject switching scheme, three bridge voltage outputs are defined as follows:

The power transfer expression from port-x to port-y (where, x, y could be 1, 2, 3) is as follows:

$$P_{xy} = \frac{4V_x V_y \sin(\varphi_y - \varphi_x)\cos(\delta_y)\cos(\delta_x)}{\pi^3 f_s L_{xy}} \quad \text{(Eq. 4)}$$

In order to minimize the circulating active power for a given set of load power levels $P_2$ and $P_3$, the power transfer between any two ports (out of the three ports $P_{12}$ $P_2$, $P_3$) is fixed, and thus must be regulated at their reference values as follows:

$$P_{12} = -\frac{2P_2 + P_3}{3} \quad \text{(Eq. 5)}$$

$$P_{23} = \frac{P_2 - P_3}{3} \quad \text{(Eq. 6)}$$

$$P_{31} = \frac{P_2 + 2P_3}{3} \quad \text{(Eq. 7)}$$

Three-level bridge voltage waveforms on the primary, secondary and tertiary sides are shown in FIG. 18. From the desired values of the duty ratios δ and phase angle differences φ of the bridge voltages, all the gate pulses can be generated with respect to a reference pulse, presented as follows:

$$Q1\text{:delay}=0; Q3\text{:delay}=\pi-2\delta_1 \tag{Eq. 8}$$

$$Q5\text{:delay}=\varphi_2+\delta_2-\delta_1; Q7\text{:delay}=\pi+\varphi_2-\delta_2-\delta_1 \tag{Eq. 9}$$

$$Q9\text{:delay}=\varphi_3+\delta_3-\delta_1; Q11\text{:delay}=\pi+\varphi_3-\delta_3 \tag{Eq. 10}$$

where Q2, Q4, Q6 and Q8 (shown in FIGS. 10 and 13) are driven with complementary pulses to those of Q1, Q3, Q5 and Q7, respectively. The duty ratios of all the gate pulses are 50%.

The design of conventional control loops as used in dual active bridge converters is not applicable to this problem due to the cross-couplings in power flow among the ports. Therefore, the subject control methodology with a three-loop structure (for controlling three reference variables), shown in FIG. 19 incorporating power flow decoupling, is employed to achieve the simultaneous charging. Both the power flow expressions of $P_{12}$ and $P_{32}$ involve $\varphi_2$ and $V_2$ as common variables. The net output power at Port-2 is a quadratic function of $V_2$ and also is a linear combination of $P_{12}$ and $P_{32}$.

The above mathematically implies that the phase shift angle $\varphi_2$ can be used as a control variable for the Port-2 output voltage. Similarly, the phase shift angle $\varphi_3$ can be used as a control variable for the Port-3 output voltage, as both $P_{13}$ and $P_{23}$ include $\varphi_3$ and $V_3$ as common terms.

Furthermore, in order to account for the cross-coupled power flow in the control loop, the third reference variable shall be the active power flow reference $P_{23}$ flowing between Port-2 and Port-3. The corresponding control variable could be either $\delta_2$ or $\delta_3$, as $\varphi_2$ and $\varphi_3$ are involved in controlling the output voltages.

It is observed that $\varphi_3$ has an important role in controlling the Port-2 output voltage (equivalently power $P_2$), and so does $\varphi_2$ in controlling Port-3 power, i.e. $P_3$. Therefore, the control loops generating the phase angle differences cannot be totally decoupled, which is solved by providing cross-loop gains to the output of the voltage controllers. Assuming $X_1$ and $X_2$ to be the voltage controller outputs, $\sin(\varphi_2)$ and $\sin(\varphi_3)$ can be generated as follows:

$$\sin(\varphi_2)=X_1+G_2X_2 \tag{Eq. 11}$$

and $$\sin(\varphi_3)=X_2+G_1X_1 \tag{Eq. 12}$$

After satisfying the hard constraints on active power transfer, there still remains the freedom in selection of the remaining two control variables, i.e. $\delta_1$ and $\delta_3$. If no other optimization constraints are applied, these two phase shift angles can be set to zero in order to transfer the maximum power.

(b) Reactive Power Flow Optimization

The subject control system 45 operates to minimize the net circulating reactive power inside the converter 12. As a part of the control variable generation algorithm, peak current stress minimization and reactive power optimization algorithms are incorporated without violating the three independent equality constraints on active power transfer towards two DC outputs. This is beneficial in selecting active semiconductors with less current rating, in minimizing the conduction losses leading to a higher conversion efficiency, as well as easier thermal management.

Figure 20:
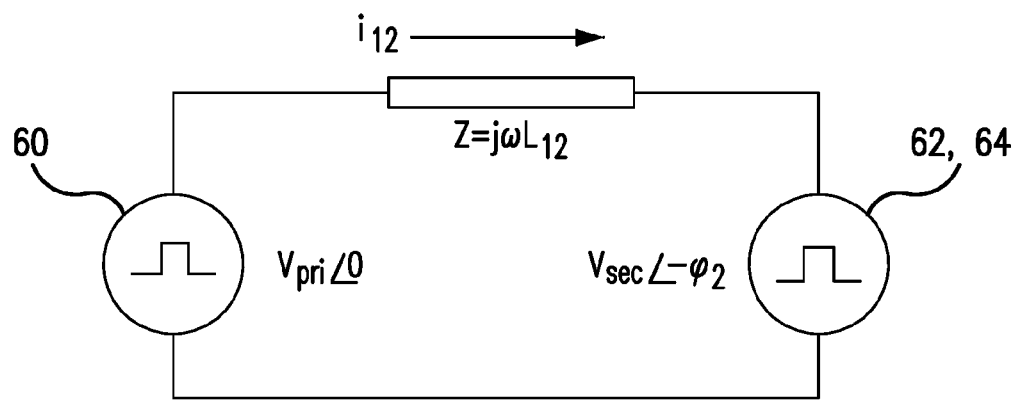
FIG. 20 is a schematic diagram representative of the 3-port network that can be modelled as 3-coupled transmission lines.

As evident from the three hard constraints set on the active power transfer among the three ports (presented in previous paragraphs), three control variables are generated from the control loop structure and the remaining two variables have the freedom for optimization constraints. In order to minimize the circulating conduction losses, the main objective of the control approach is to make the net reactive power injected into the network to zero. The three-port network can be modeled as three coupled transmission lines, one of which is depicted in FIG. 20.

The reactive power flow from Port-1 to Port-2 and in the reverse direction can be expressed as follows:

$$Q_{12} = \frac{V_1\cos(\delta_1)[V_2\cos(\delta_2)\sin(\varphi_2) - V_1\cos(\delta_1)]}{2\pi f_s L_{12}} \tag{Eq. 13}$$

and $$Q_{21} = \frac{-V_2\cos(\delta_2)[V_1\cos(\delta_1)\sin(\varphi_2) - V_2\cos(\delta_2)]}{2\pi f_s L_{12}} \tag{Eq. 14}$$

As follows from Eqs. 13-14, for an asymmetric network, the sum of two reactive powers is not equal to zero with no interdependence constraint being applied to $\delta_1$ and $\delta_2$, which essentially means that there will inevitably be a phase difference between any bridge voltage and switch current, which unavoidably increases the peak level of the device current.

In case of a three-port network, there are six different paths for reactive power flow, which must sum to zero and hence, the following condition can be set:

$$Q_{12}+Q_{13}+Q_{23}+Q_{21}+Q_{32}+Q_{31}=0 \tag{Eq. 15}$$

Eq. 15 essentially results into a quadratic relation between $\cos(\delta_1)$ and $\cos(\delta_3)$ for a given set of $\varphi_2$, $\varphi_3$, $\delta_2$ generated from the control loop. Therefore, applying reactive power minimization constraints reduces the degrees of freedom for selection of duty ratios from two to one. If no additional constraints are imposed, $\delta_3$ can be set to zero for enabling maximum power transfer and $\delta_1$ can be determined.

Figure 21:
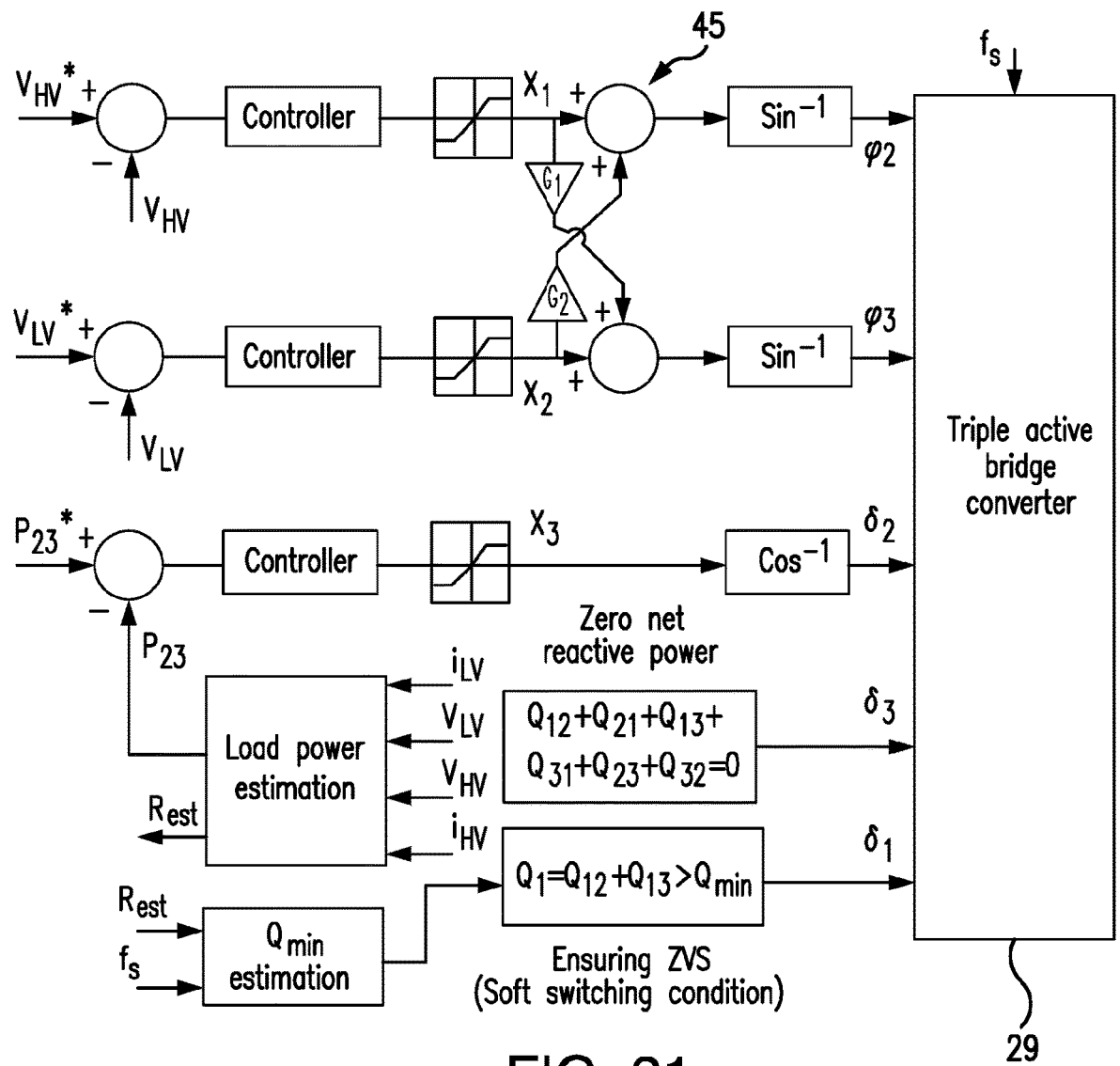
FIG. 21 is a block diagram of the control architecture of the triple active bridge (TAB) converter with reactive power minimization.
Figure 22:
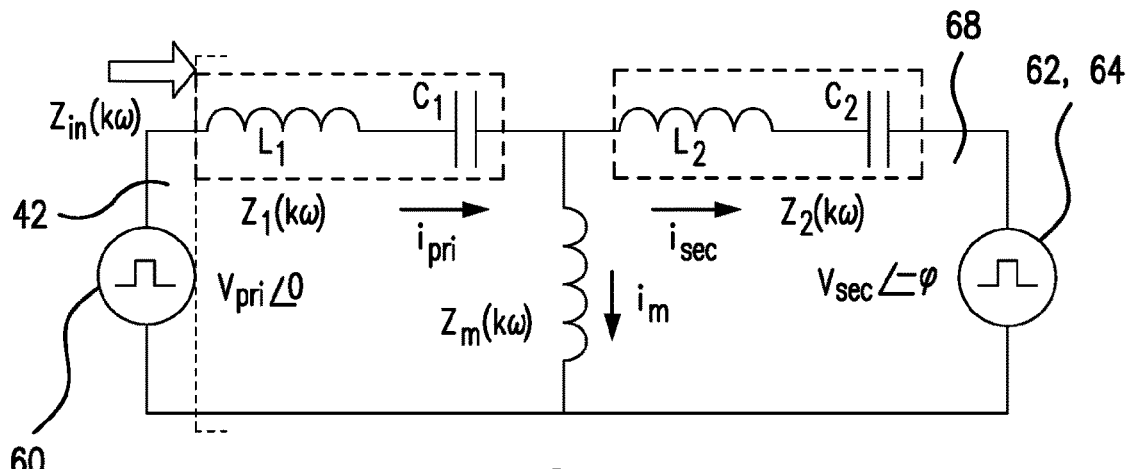
FIG. 22 is an equivalent circuit of a resonant DC/DC converter for the subject on-board charger for electric vehicles.
Figure 23:
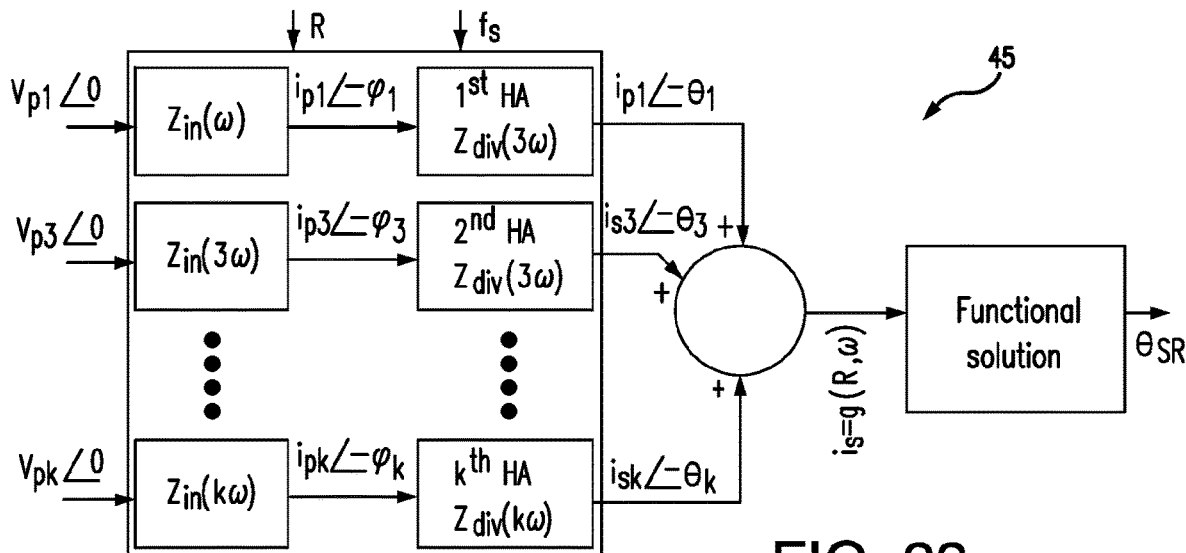
FIG. 23 is a diagram of a generalized harmonic model.
Figure 24:
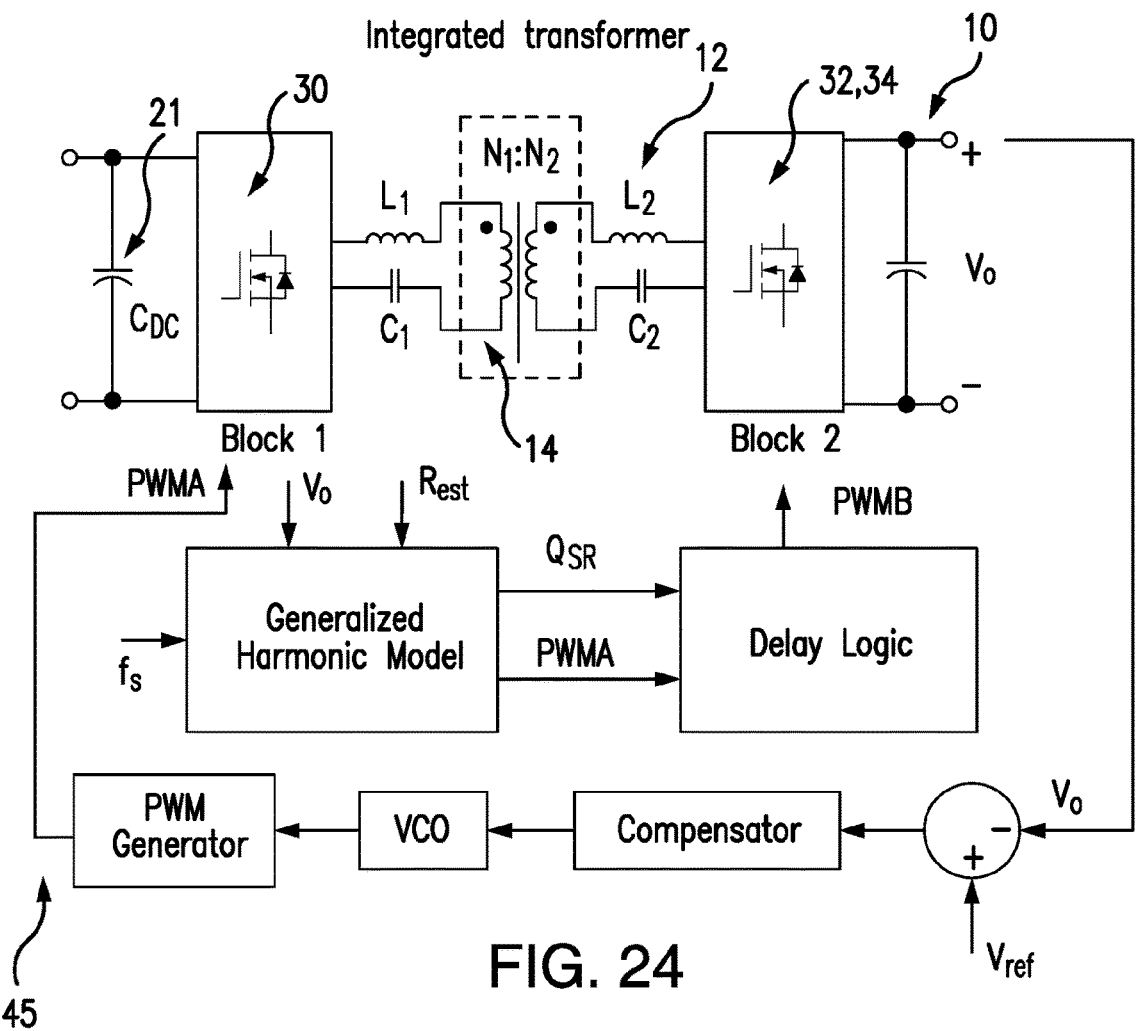
FIG. 24 is a block diagram representative of the subject control system using both primary side control and synchronous rectification for resonant-based topology.

Furthermore, an additional constraint arises due to ensuring soft-switching at all the MOSFETs, which requires a minimum reactive power to be flowing from the input port. Assuming a minimum phase lag angle θ required between the fundamental of primary bridge voltage and primary winding current at a particular load power to ensure ZVS (Zero-Voltage-Switching), the minimum reactive power from Port-1 is as follows:

$$Q_1=Q_{12}+Q_{13}>Q_{1,min}=P_1\tan(\theta) \tag{Eq. 16}$$

where $P_1$ denotes the active power input from port-1.

θ can be calculated from the condition that instantaneous inductive energy during switching has to be greater than the energy stored in MOSFET output capacitors. Therefore, there exist four equality constraints and one inequality constraint (for soft-switching), based on which four control variables can be explicitly determined whereas the fifth variable will have a range of solution. The control system block diagram with constraints on reactive power and soft-switching is shown in FIG. 21.

(c) Synchronous Rectification Operation

An efficient bi-directional power flow can be achieved by incorporating synchronous rectification in the secondary MOSFETs (Q5-Q8, shown in FIG. 10) during the grid-tovehicle (G2V) charging mode and in the primary MOSFETs (Q1-Q4, shown in FIG. 10) during the vehicle-to-grid (V2G) discharging mode of operation. The proposed method accurately predicts the zero crossing instant of the resonant currents based on comprehensive and generalized harmonics modeling of the entire converter. This method helps to achieve synchronous rectification operation without even requiring any high bandwidth secondary side current sensor.

In case of any resonant based variations presented in the previous paragraphs, the secondary side of the converter requires rectification to convert the high frequency AC output of the transformer to DC. Conventionally, diodes are used on the secondary side, which can automatically detect the phase of current by switching at zero crossing of current. The use of diodes as secondary rectification devices leads to higher conduction loss due to on-state voltage drop of the diode and also hinders the bidirectional operation capability of circuit. In order to enable bidirectional power transfer capability and improve efficiency, diodes are replaced by switches, depicted in FIG. 11. The use of the secondary switches leads to the requirement of tracking of zero crossing of secondary side resonant current for synchronous rectification. During SR operation, phase shift has to be introduced between the primary gate signals and secondary gate signals synchronizing with the zero crossing of secondary side resonant current.

In order to regulate the output voltage and control the power flow, primary side control using pulse frequency modulation (PFM) is conducted and the required phase angle difference between primary and secondary gate pulses is calculated using the proposed generalized harmonics modeling approach. The equivalent circuit of an isolated resonant DC/DC converter is present at FIG. 22. Since the secondary side 68 acts just as a rectifier, the gate pulses are generated based on the resonant current polarity. Therefore, the net phase difference between the primary and secondary gate pulses equals to the sum of phase angle of the input impedance and the phase angle difference between secondary $i_{see}$ and primary $i_{pri}$ resonant current at the secondary side 68 and primary side 42, respectively. Despite that a resonant circuit is typically analyzed using first harmonic approximation, the subject control scheme incorporates the effects of other higher order odd harmonics in net resonant current expression and thus, determines a more accurate zero crossing angle.

Since the input to the AC equivalent model (shown in FIG. 22) of a resonant converter is a bipolar square wave, i.e., a set of input voltage sources of odd order frequencies connected in series to a passive network, superposition theorem is used to calculate the effect of each harmonic on output current. For each harmonics, the input impedance phase angle and the phase shift between primary and secondary resonant currents can be calculated. According to the diagram shown in FIG. 22, different phase angles and impedances are expressed as follows:

$$Z_{in}(k\omega) = Z_1(k\omega) + Z_m(k\omega) \| (Z_2(k\omega) \| R_{eq}) \quad \text{(Eq. 17)}$$

$$\text{where } Z_1(k\omega) = jk\omega L_{pri} - \frac{j}{k\omega C_{pri}} \quad \text{(Eq. 18)}$$

$$Z_m(k\omega) = jk\omega L_m \quad \text{(Eq. 19)}$$

$$Z_2(k\omega) = jk\omega L'_{sec} - \frac{j}{k\omega C'_{sec}} m, \quad \text{(Eq. 20)}$$

where k is the order of the harmonics

Furthermore, the phase difference between primary and secondary current is expressed as:

$$\varphi_k = \text{angle}\left(\frac{Z_m(k\omega)}{Z_m(k\omega) + Z_2(k\omega) + R_{eq}}\right) \quad \text{(Eq. 21)}$$

Therefore, the net current expression flowing on the secondary side is given as the sum of all odd harmonics current:

$$i_{sec} = \sum_{k=1}^{\infty} \frac{4V_{DC}}{k\pi |Z_{in}(k\omega)|} \left| \frac{Z_m(k\omega)}{Z_m(k\omega) + Z_2(k\omega) + R_{eq}} \right| \sin(k\omega t - \alpha_k - \varphi_k) \quad \text{(Eq. 22)}$$

The secondary side 68 gate pulses (i.e. synchronous rectification) can be generated by detecting the zero crossing (online/offline) of the formulated resonant current for a given set of load resistance and switching frequency. The order of harmonics up to which this sum needs to be carried out possesses a trade-off between accuracy and computational complexity. The generalized harmonic model and the overall control block diagram are demonstrated in FIGS. 23-24, respectively.

Figure 25:
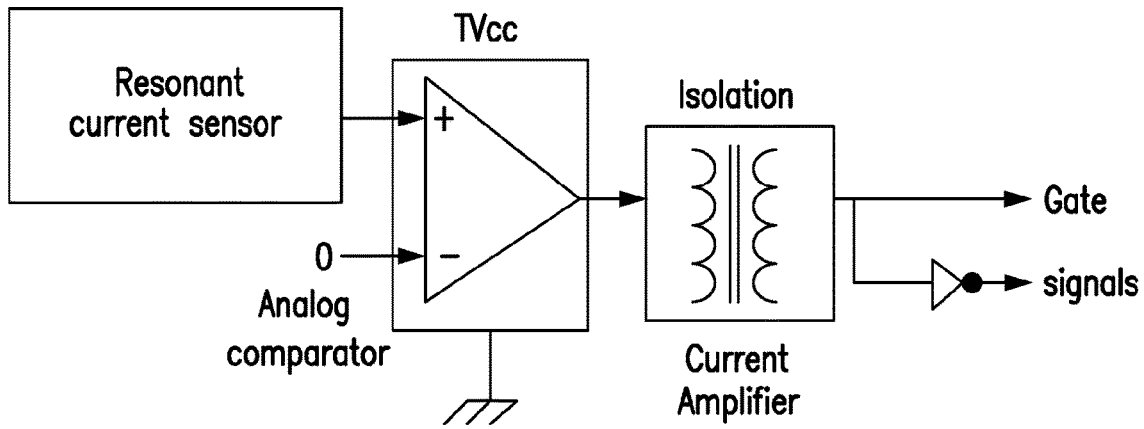
FIG. 25 is a block diagram of an alternative synchronous rectification structure for rectification control in the subject on-board charger.

The implementation of the synchronous rectification control is not only restricted to digital domain, but also can be performed using analog solutions, as shown in FIG. 25, where the secondary side resonant current sensed by a high bandwidth current sensor can be compared with zero using a high speed comparator, and thus, the comparator output can be fed as gate signals to the secondary side semiconductors after maintaining electrical isolation (if necessary).

Three-Phase Integrated OBC Capable of Simultaneous Charging Both HV and LV Batteries from the Grid.

Various topologies are contemplated herein which constitute the subject on-board charging system 10 that are capable of realizing simultaneous charging by means of alternative triple active bridge and transformer configurations, including a single-stage configuration 100 and a two-stage configuration system 102 of the subject system 10, which can be controlled through pulse frequency modulation (PFM) or pulse width modulation (PWM).

Figure 26:
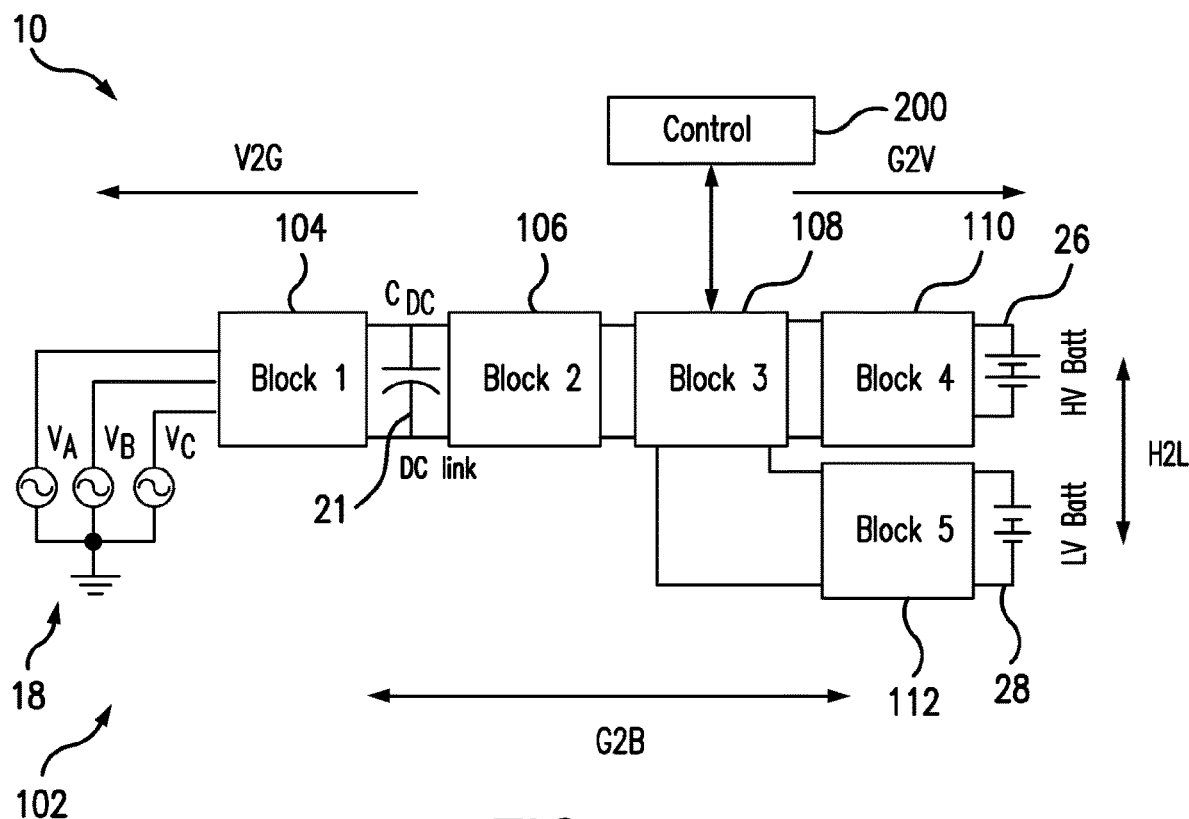
FIG. 26 is a block diagram of a subject modular two-stage on-board charger for simultaneous charging by means of various bridge and transformer configurations.

The modular two-stage configurations 102 are presented by a block diagram depicted in FIG. 26, which can be further categorized as single-phase and three-phase configurations. The charger modules, also referred to herein as Blocks 1, 2, 3, 4, 5, or charger sub-systems, which are depicted in FIG. 26, are configured with multiple converters interconnected in parallel to split the power flow, as will be detailed in further paragraphs.

The two-stage charger system 102, as shown in FIG. 26, has a modular configuration, which includes:
 (a) a Block 1, also referred to herein as charger subsystem 104, which can be a bi-directional three-phase PFC rectifier or three single-phase PFC rectifiers connected in parallel. In an alternative embodiment, the module 104 can be a modular multilevel converter (MMC), which offers modularity and fault tolerance capability.
 (b) a charger sub-system (Block 2) 106 can be implemented as a single three-phase bridge, or multiple full bridges, or half bridges, depending on the DC link structure.
 (c) Block 3, also referred to herein as the changer subsystem 108, represents the integrated transformer subsystem, which can be implemented with two or three transformer sets coupled in parallel by means of separate structures, through star or delta connections.

(d) Block 4, also referred to herein as a charger subsystem 110, may be implemented as a full bridge rectifier or half bridge rectifier for the HV battery 26. Depending on the transformer configuration in the modular sub-system 108, Block 4 may include two or three parallel full bridge rectifiers or parallelly connected half bridge rectifiers.

(e) Charger sub-system 112 (Block 5) is coupled to the transformer sub-system 108 in the module (Block 3) and may be implemented with one or more full-bridge rectifiers or one or more half-bridge rectifiers for the LV battery 28.

The operation of each block 2, 3, 4, 5 is influenced by the preceeding stage. Different combinations of the modular stages 104, 106, 108, 110, 112 (presented in Table III) result in numerous alternative topologies. For instance, the integrated transformers in Block 3 may be parallel connected, delta or star connected, or have a three-phase structure, with alternative bridge configurations (a half-bridge or a full-bridge) as well.

TABLE III

Summary of two-stage alternative topological configurations of the subject OBC

| T# | Block 1 | Block 2 | Block 3 | Block 4 | Block 5 | Split DC link |
|---|---|---|---|---|---|---|
| 1 | Three-phase Boost PFC | Two full bridges or half bridges in parallel | Two separate transformers | Two full bridges or half bridges in parallel | Two full bridges or half bridges in parallel | No |
| 2 | Three-phase Boost PFC | Two full bridges or half bridges separately | Two separate transformers | Two full bridges or half bridges in parallel | Two full bridges or half bridges in parallel | Yes |
| 3 | Three-phase Buck PFC | Two full bridges or half bridges in parallel | Two separate transformers | Two full bridges or half bridges in parallel | Two full bridges or half bridges in parallel | No |
| 4 | Three-phase Buck PFC | Two full bridges or half bridges separately | Two separate transformers | Two full bridges or half bridges in parallel | Two full bridges or half bridges in parallel | Yes |
| 5 | Three-phase Vienna PFC | Two full bridges or half bridges separately | Two separate transformers | Two full bridges or half bridges in parallel | Two full bridges or half bridges in parallel | No |
| 6 | Three-phase Vienna PFC | Two full bridges or half bridges separately | Two separate transformers | Two full bridges or half bridges in parallel | Two full bridges in parallel | Yes |
| 7 | Three-phase Boost PFC | Three-phase bridge | Three separate transformers; primary delta connected with capacitors; secondary series connected with capacitors | Three full bridges or half bridges | Three full bridges or half bridges | No |
| 8 | Three-phase Boost PFC | Three-phase bridge | Single three-phase transformer/three separate transformers | Three full bridges or half bridges | Three full bridges or half bridges | No |
| 9 | Three-phase Buck PFC | Three-phase bridge | Three separate transformers; primary delta connected with capacitors; secondary series connected with capacitors | Three full bridges or half bridges | Three full bridges or half bridges | No |
| 10 | Three-phase Buck PFC | Three-phase bridge | Single three-phase transformer/three separate transformers | Three full bridges or half bridges | Three full bridges or half bridges | No |
| 11 | Three single-phase Boost PFC | Three full bridges or half bridges | Single three-phase transformer/three separate transformers | Three full bridges or half bridges | Three full bridges or half bridges | No |
| 12 | Three single-phase Buck PFC | Three full bridges or half bridges | Single three-phase transformer/three separate transformers | Three full bridges or half bridges | Three full bridges or half bridges | No |
| 13 | Modular multilevel converter | Two full bridges or half bridges in parallel | Two separate transformers | Two full bridges or half bridges in parallel | Two full bridges or half bridges in parallel | No |
| 14 | Modular multilevel converter | Three full bridges or half bridges | Single three-phase transformer/three separate transformers | Three full bridges or half bridges | Three full bridges or half bridges | No |
| 15 | Modular multilevel converter | Three-phase bridge | Three separate transformers; primary delta connected with capacitors; secondary series connected with capacitors | Three full bridges or half bridges | Three full bridges or half bridges | No |

Figure 27:
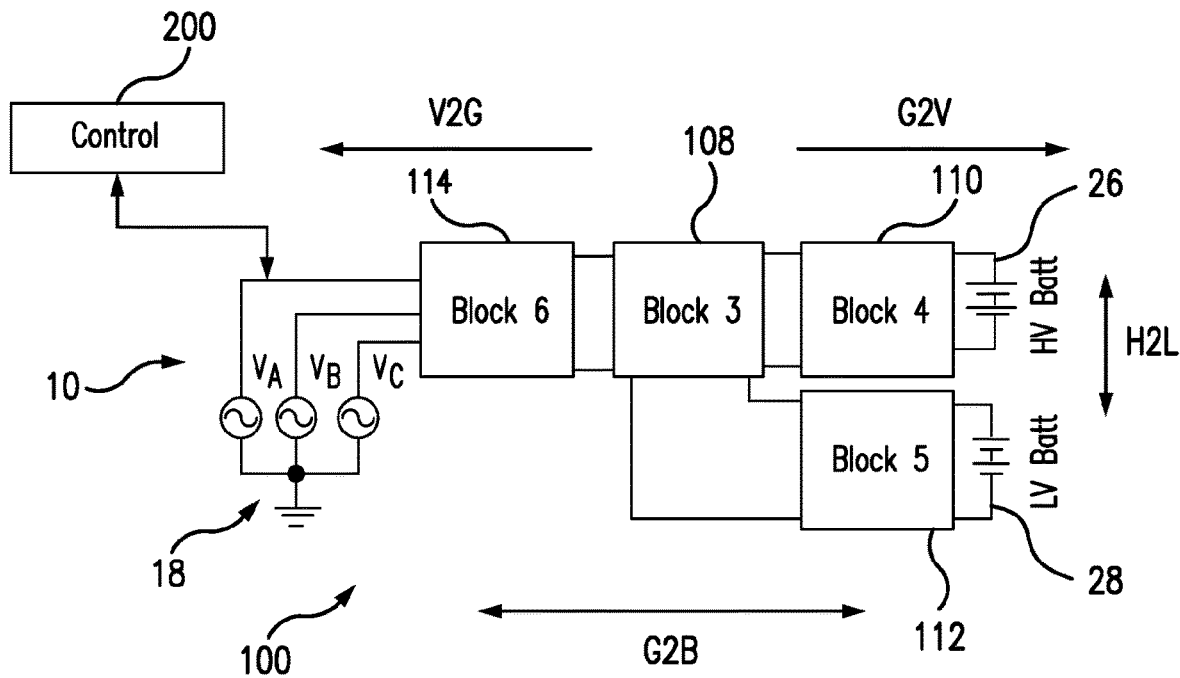
FIG. 27 is a block diagram for a subject modular single-stage converter.

The single-stage system 100 is depicted as a modular diagram shown in FIG. 27. Compared to the two-stage system 102, the single-stage system 100 does not need the DC link capacitor. The Block 6, also referred to herein as a module, stage, or charger sub-system 114, represents a single-stage AC-DC converter, which can be implemented as a Swiss-derived converter or a matrix converter. Blocks 2, 3, 4, 5 shown in FIG. 26 correspond to blocks 2, 3, 4, 5 depicted in FIG. 27. Various single-stage derived topologies contemplated in the subject OBC are reflected in Table IV.

TABLE IV

Summary of single-stage alternative topological configurations of the subject OBC.

| T# | Block 6 | Block 3 | Block 4 | Block 5 |
|---|---|---|---|---|
| 16 | Three single-phase AC-DC converters in parallel | Three separate transformers | Three full bridges or half bridges | Three full bridges or half bridges |
| 17 | Matrix-based three-phase AC-DC TAB converter | Two separate transformers | Two full bridges or half bridges in parallel | Two full bridges or half bridges in parallel |
| 18 | Swiss-based TAB converter with split AC capacitors | Two separate transformers | Two full bridges or half bridges in parallel | Two full bridges or half bridges in parallel |
| 19 | Three single-phase AC-DC converters in parallel | Three separate transformers; primary delta connected with capacitors; secondary series connected with capacitors | Three full bridges or half bridges | Three full bridges or half bridges |
| 20 | Three single-phase AC-DC converters in parallel | Single three-phase transformer/ three separate transformers | Three full bridges or half bridges | Three full bridges or half bridges |

Figure 28:
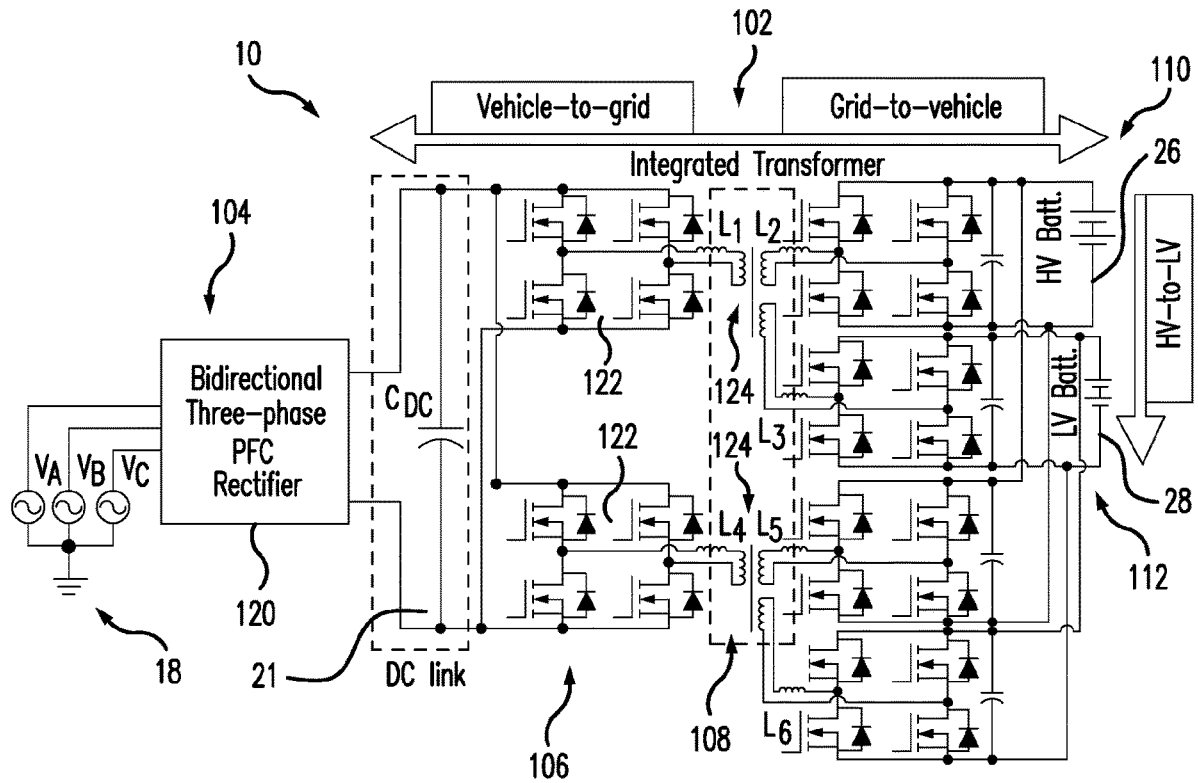
FIG. 28 is a block diagram of the subject bi-directional OBC having three-phase integrated PFC rectifier and capable of simultaneous charging both HV and LV batteries from the grid.

One of the topologies of the two-stage charger 102 is presented in FIG. 28. This topology includes a bi-directional three-phase PFC rectifier 120 of the module 104, a DC link 21 with the capacitor $C_{DC}$, two triple active full bridge converters 122 of the module (stage) 106 connected in parallel with six shim inductors $L_1$-$L_6$ of the two integrated transformers 124 of the module (stage) 108. The shim inductors $L_1$-$L_6$ are used for transferring power and achieving soft-switching for the MOSFET switches in the DC/DC converters in modules 110, 112, inherently, that may be obtained through leakage inductance control of the integrated transformers 124.

By using the parallel structure (converters 122 and transformers 124), the maximum achievable power transfer capability is increased with reduced conduction losses and voltage/current stress on the circuitry components. The modular design of the three-phase high-power integrated OBC 102 shown in FIG. 28 provides high reliability and further improves the power transfer efficiency. A combined phase shift and duty ratio control is implemented in the configuration shown in FIG. 28 to minimize reactive power and circulating energy, and to enable the power flow in different directions (V2G), (G2V), and (H2L), as well as (G2B), and B2G).

By means of electromagnetic integration of the transformers 124 and by splitting the power flow in parallel paths, the subject system 102 can be used for simultaneous charging of the HV and LV batteries at high-power ratings.

There are numerous alternative embodiments contemplated in the subject OBC system 102.

Architecture I (Three-Phase PFC+Single-Phase DC/DC Converter)

Figure 29:
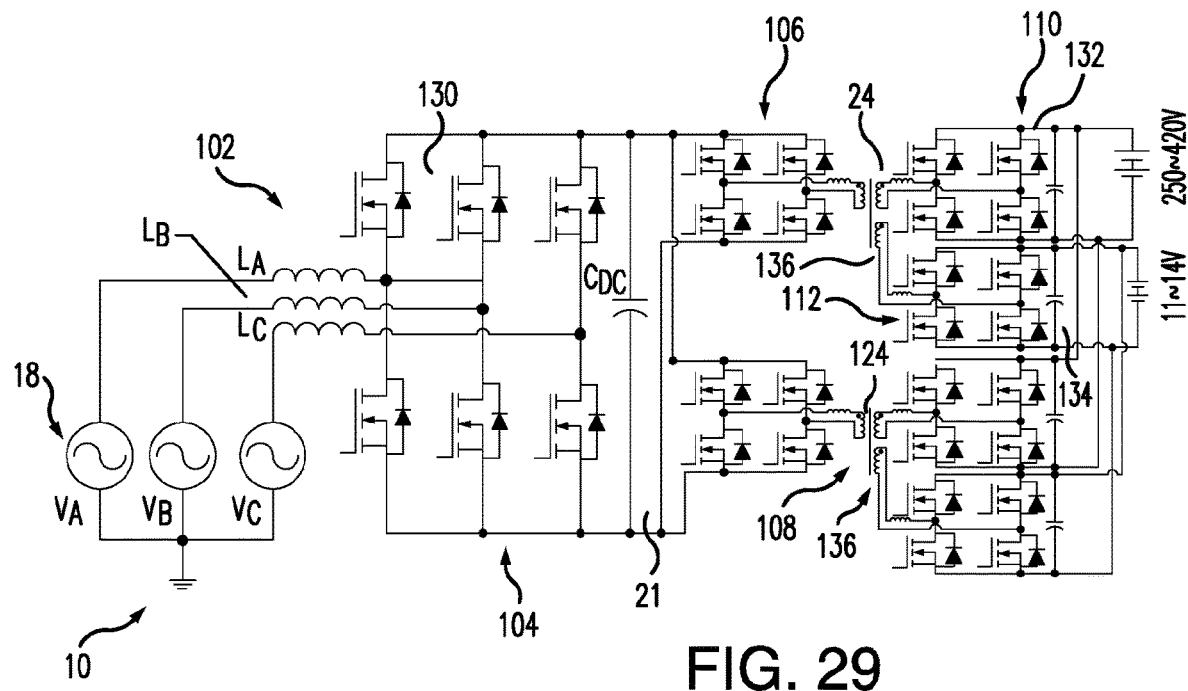
FIG. 29 is representative of the subject topology using three-phase boost PFC rectifier and integrated with the TAB having input parallel-output parallel.

This architecture embodiment, shown in FIG. 29, uses a three-phase PFC rectifier 130 (in the module 104) as the front-end stage prior to the DC link 21, which provides flexibility to the DC/DC stage 110, 112 configuration which is configured with single-phase DC/DC converters 132, 134, respectively. The tertiary winding 136 is integrated into the transformers 124 in the single-phase DC/DC converters 130, 132, to ensure simultaneous charging for the HV and LV batteries 26, 28 from the grid 18, as well as the H2L power flow.

The Topology shown in FIG. 29 has a parallel structure in the DC/DC stage (formed by the modular sub-systems 106, 108, 110, 112). By means of splitting the power into two separate DC/DC converters 132/134, conduction losses and voltage/current stress can be reduced. The topology shown in FIG. 29 is highly symmetrical. This leads to a relatively simple control of the power flow in different directions.

Figure 30:
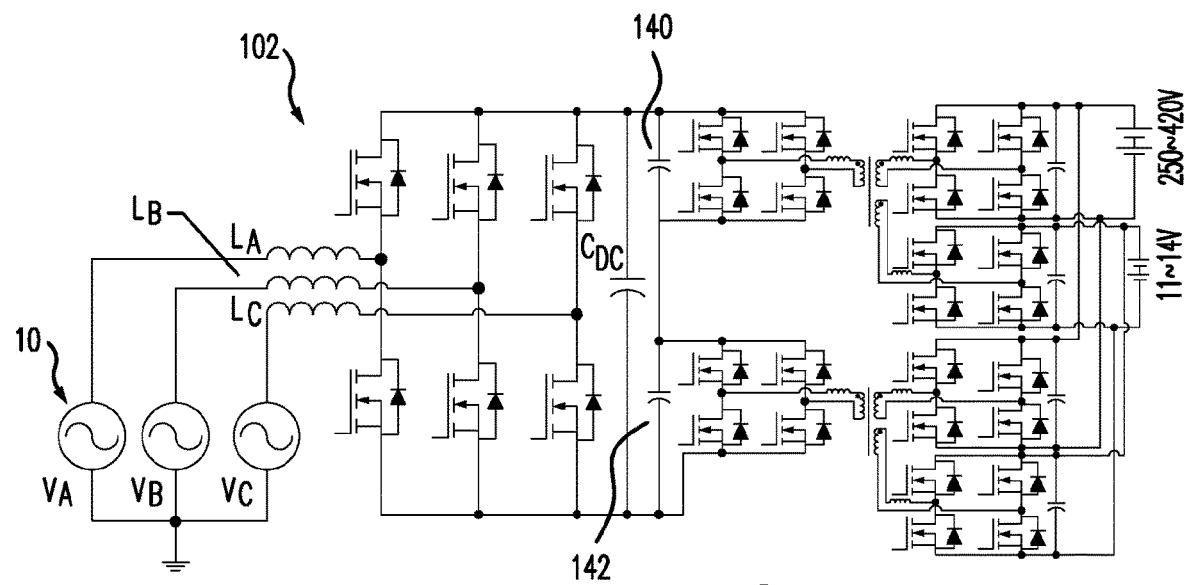
FIG. 30 is representative of the subject alternative topology with the three-phase boost PFC rectifier integrated with a TAB having input split-output parallel.

Alternative to the Topology shown in FIG. 29, the Topology 2 shown in FIG. 30 splits the DC link capacitor $C_{DC}$ into two capacitors. This configuration has the advantage of a lower voltage stress on the DC/DC stage components, which helps to reduce the cost and overall dimensions of the OBC system 102. Moreover, by splitting the DC link voltage, the converter gain of the TAB stage 110, 112 requires less phase shift modulation, which reduces the circulating power.

Figure 31:
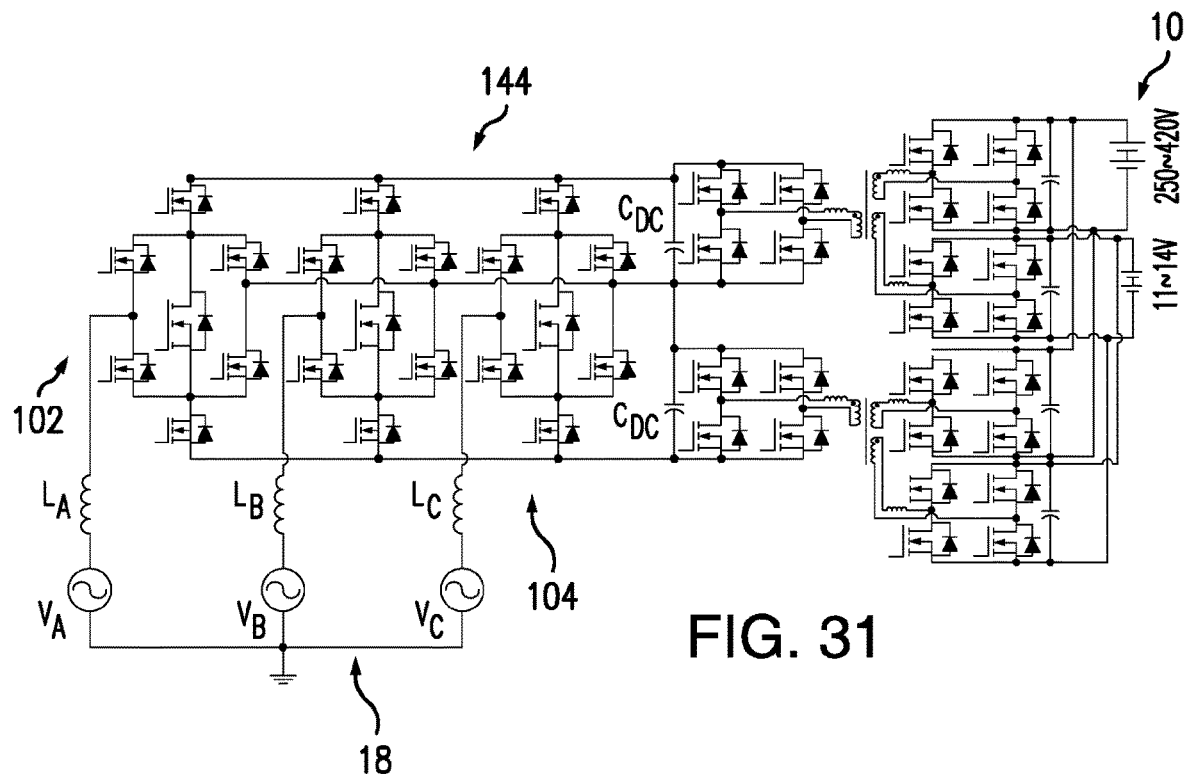
FIG. 31 is representative of the subject alternative topology with a Vienna-based TAB converter with split DC link.

An alternative embodiment of the subject two-stage system 102 is depicted in FIG. 31, where a three-phase Vienna PFC rectifier 144 is implemented as the front-end stage (module) 104, where the switching losses and voltage stress of each component can be reduced.

Architecture II (Three-Phase PFC+Three-Phase DC/DC Converter)

In this architecture, alternative topologies are contemplated which are focused on the DC/DC stage. Instead of using multiple single-phase converters connected in parallel, a three-phase integrated topology is suggested for two output ports, which can be categorized as a resonance-based and a PWM-based, shown in FIG. 32 and FIG. 33, respectively.

Figure 32:
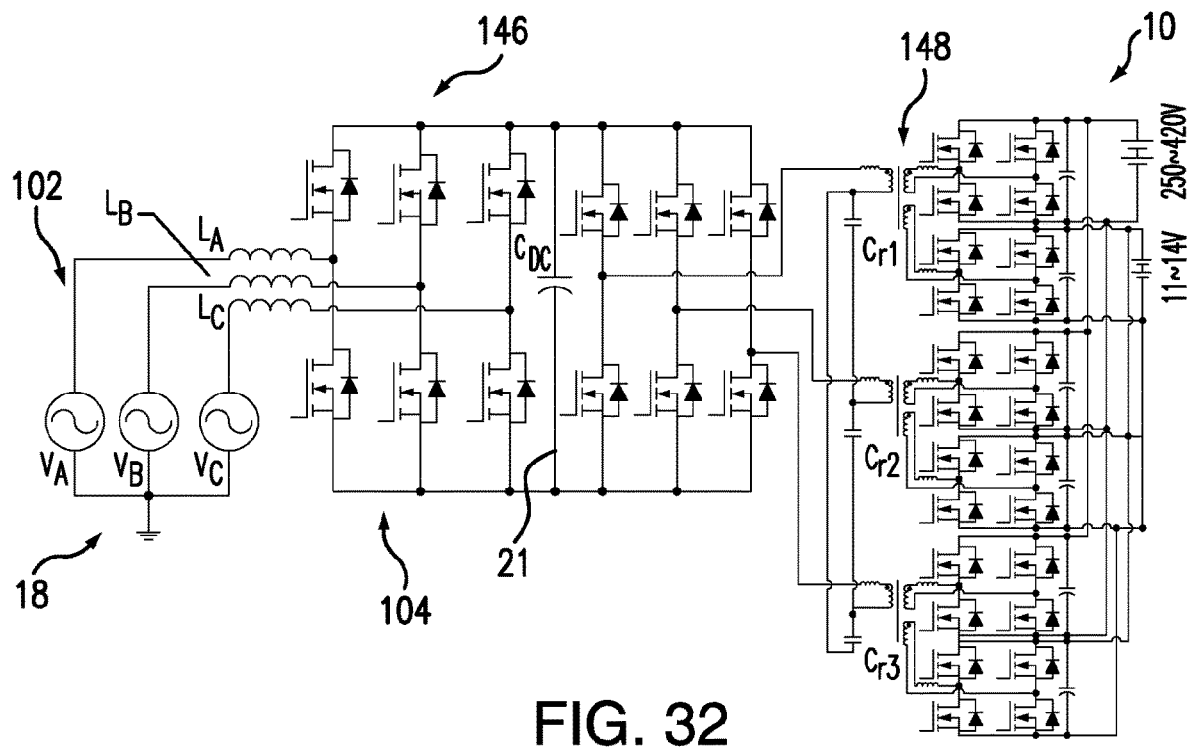
FIG. 32 is representative of the subject alternative topology with the three-phase boost PFC rectifier integrated with three-phase CLLC.

The topology shown in FIG. 32, of the two-stage OBC configuration 102 of the subject system 10 uses a three-phase Boost PFC rectifier 146 (as the front stage 104) and a three-phase bi-directional CLLLC resonant DC/DC converter 148.

Figure 33:
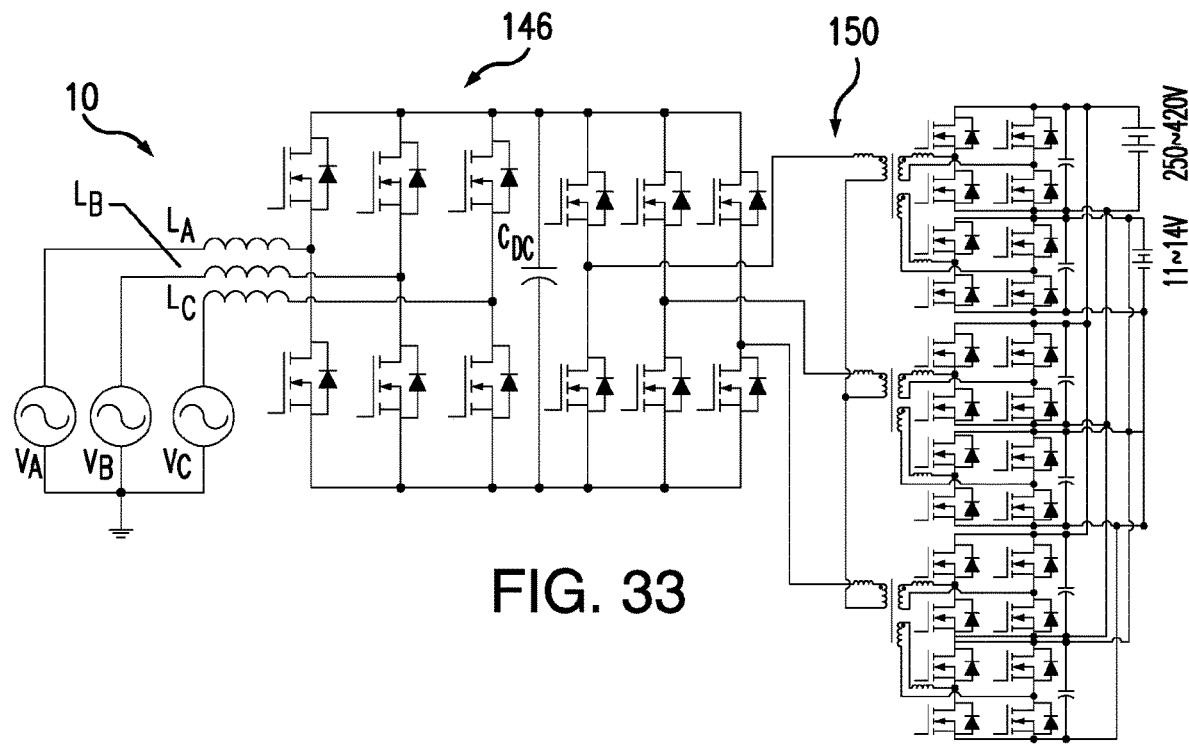
FIG. 33 is representative of the subject alternative topology with the three-phase boost PFC rectifier integrated with a 3-phase TAB.

The topology, shown in FIG. 33, uses the three-phase Boost PFC rectifier 146 and the three-phase TAB 150.

Architecture III (Three Single-Phase PFC+Single-Phase DC/DC Converter)

Figure 34:
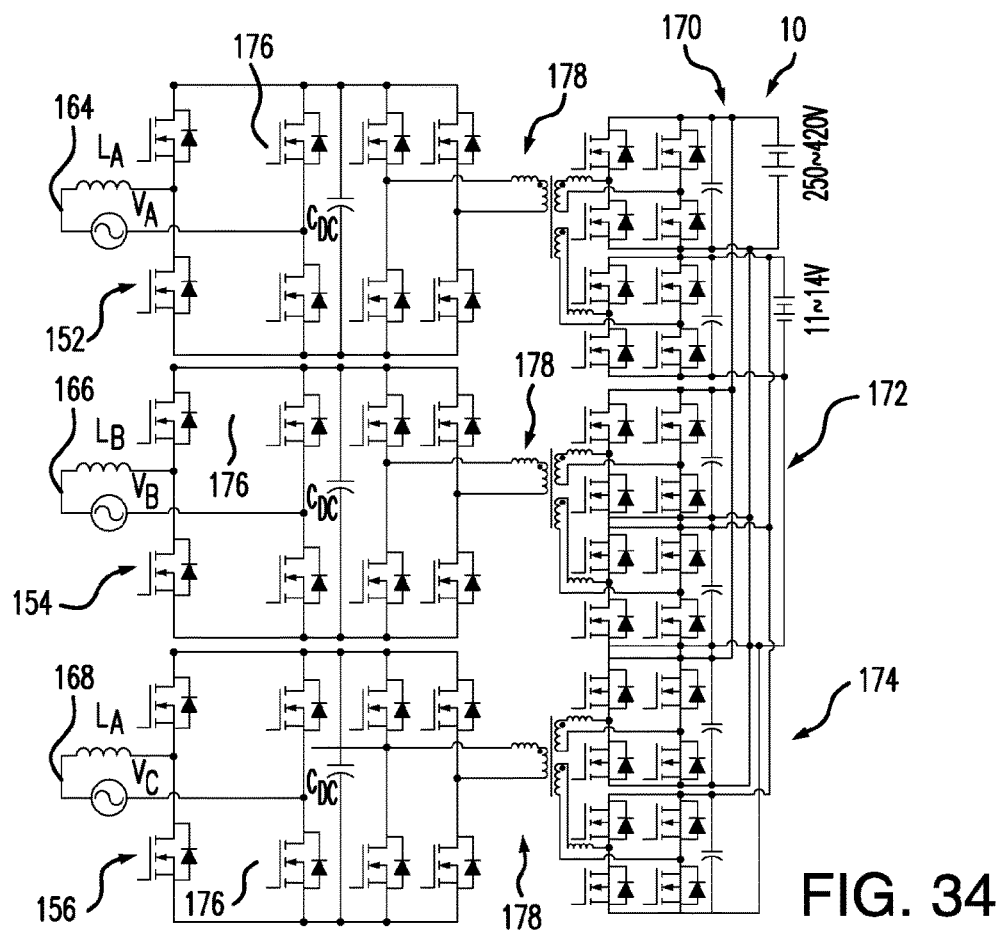
FIG. 34 is representative of the subject alternative topology including three single-phase H-bridge PFC rectifiers with TAB converters connected in parallel.

In this architecture, single-phase converters are implemented in a modular configuration, as shown in FIG. 34, which provides a high system level reliability. Each module 152, 154, 156 in the topology shown in FIG. 34, connects with one phase input 164, 166, 168, respectively, while having parallelly connected outputs 170, 172, 174. This configuration also has the advantage of flexibility since each module is identical and easy to replace.

Architecture IV (Single-Stage System)

Figure 35:
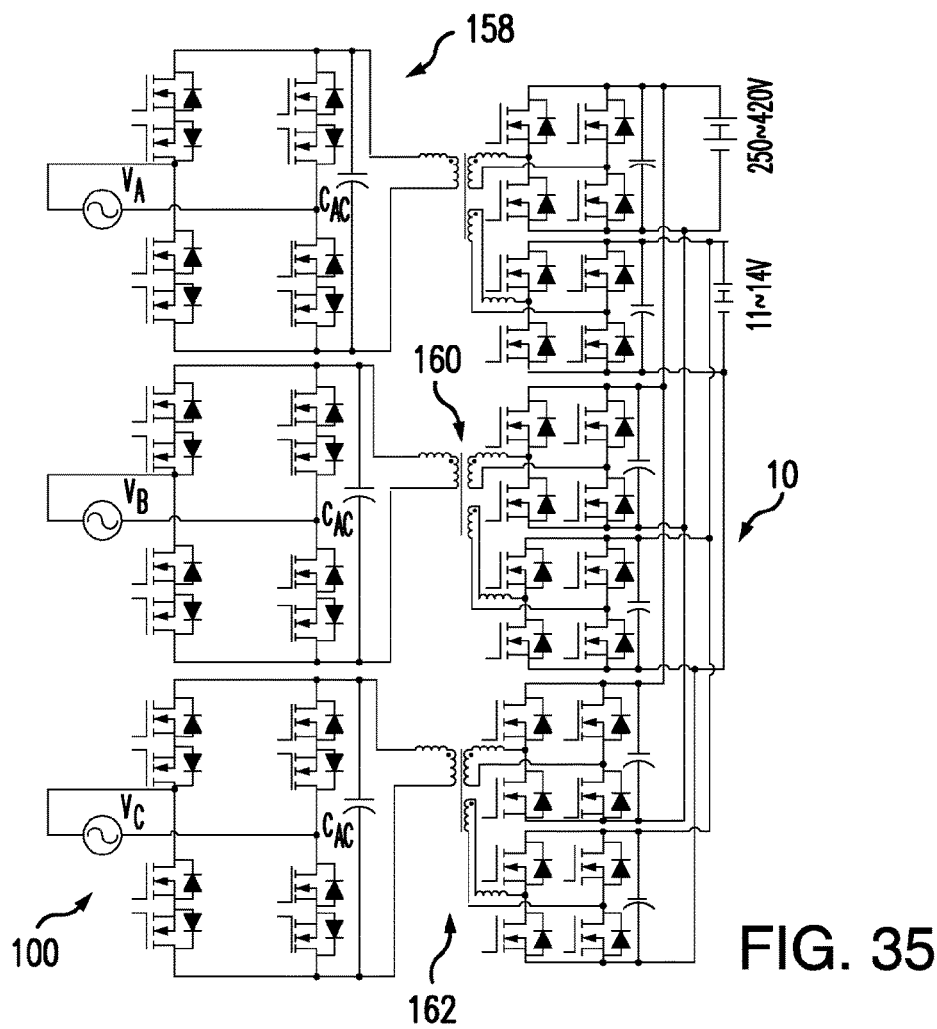
FIG. 35 is representative of the subject alternative topology including three single-phase AC-DC TAB converters connected in parallel.
Figure 36:
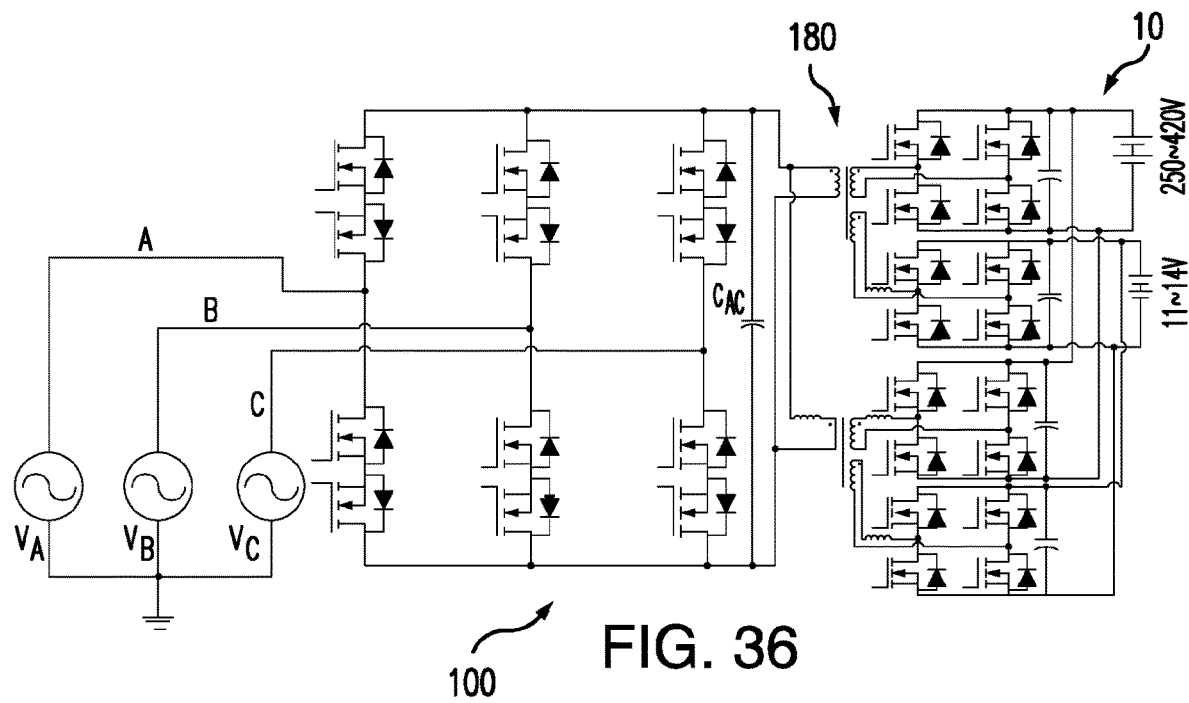
FIG. 36 is representative of the subject alternative topology including a matrix-based three-phase AC-DC TAB converter.
Figure 37:
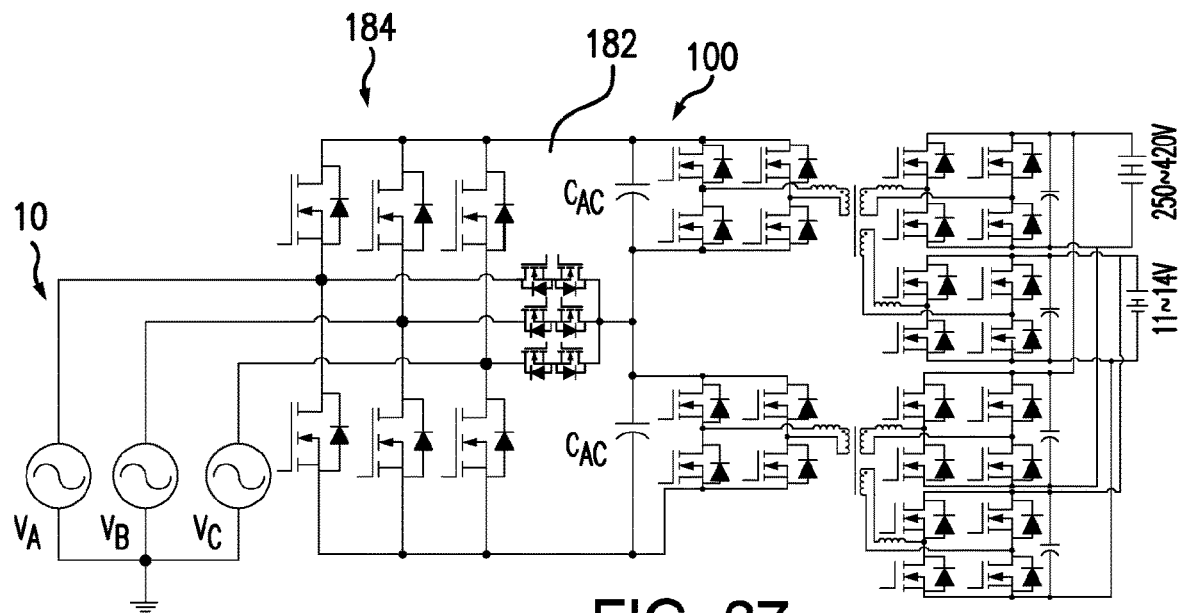
FIG. 37 is representative of the subject alternative topology with the Swiss-based TAB converter with split capacitors.

In the architecture of the single-stage charger configuration 100 of the subject system 10, shown in FIGS. 35, 36, 37, the PFC rectifier and the DC/DC converter are combined in a single-stage implementation by removing the DC link capacitor. The AC capacitors are needed in this embodiment for filtering purposes. By means of parallel connection of the outputs, line frequency voltage ripple can be eliminated to a desired extent, which is another advantage in the three-phase system as compared to the single-phase OBC system.

The topology of the configuration 100, shown in FIG. 35 is represented by three single-phase AC/DC TAB converters 158, 160, 162 interconnected in parallel.

The configuration 100 using a matrix-based three-phase AC/DC TAB converter 180 is shown in FIG. 36. The Swiss-based topology embodiment, shown in FIG. 37, achieves all the main advantages of a SWISS Rectifier. The system shown in FIG. 37 uses the SWISS-based TAB converter 182 with split capacitors $C_{AC}$ can be controlled similar to a DC/DC converter while maintaining the achievable high efficiency at high-power rating. Fundamental knowledge of a buck-type DC/DC converter and a three-phase diode rectifier is sufficient to operate a three-phase PFC rectifier 184 with the sinusoidal input current and a regulated output voltage.

Architecture V (MMC-Based System)

Figure 38:
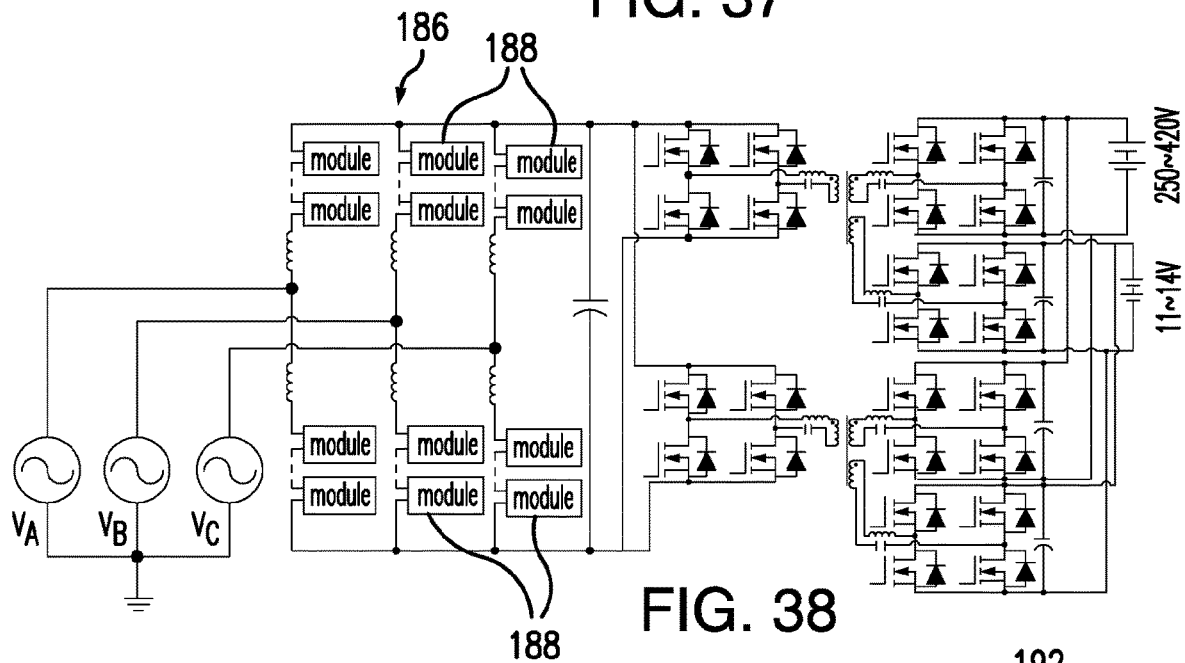
FIG. 38 is representative of the subject alternative topology having MMC-based system with the TAB having input parallel-output parallel.
Figure 39A:
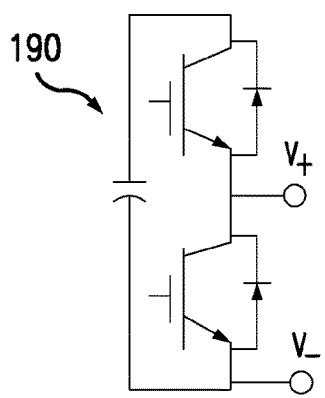
FIGS. 39A and 39B are representative of the sub-module configurations in the subject MMC-based system with half bridge and full bridge, respectively.
Figure 39B:
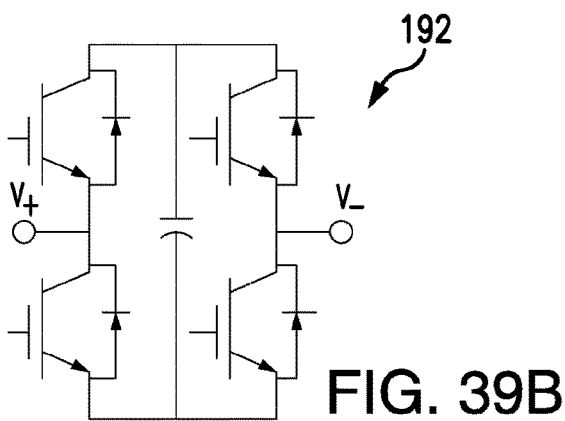

In this architecture, the PFC rectifier stage is replaced with the MMC system 186, which brings modularity and fault tolerance capability. FIG. 38 shows the topology of an MMC-based system. In each module 188 of the MMC system 186, two kinds of circuit topologies are contemplated, including a half bridge 190 and/or a full bridge 192, as shown in FIG. 39A, 39B, respectively.

Figure 40A:
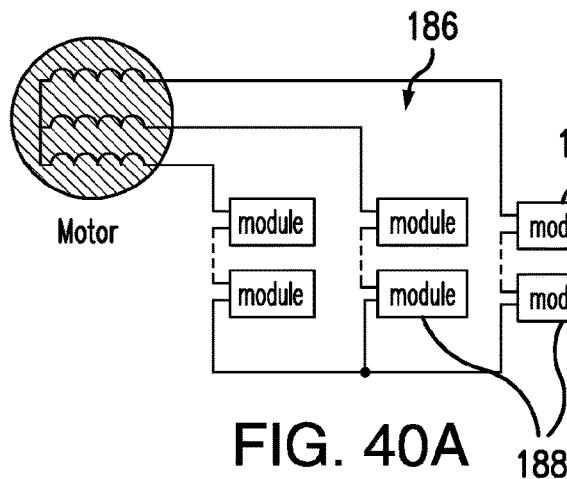
FIGS. 40A and 40B are representative of the configurations of the windings using the subject MMC based system with a single star and single delta connections, respectively.
Figure 40B:
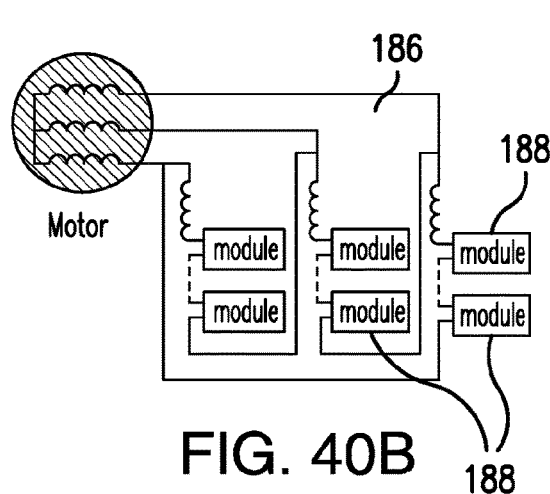

The MMC-based integrated onboard charger 186 can be interfaced with the propulsion system of an EV, as shown in FIGS. 40A-40B, where MMC provides the flexibility to the winding reconfiguration of the motor. It helps prevent torque production and improve the efficiency and lifespan of the motor. FIG. 40A depicts a single-star configuration of the windings using MMC; while FIG. 40B depicts a single-delta configuration of the windings.

Power Flow Control

A conventional control strategy for a Triple Active Bridge (TAB)-based converter may be supported by the phase shift modulation (PSM) concept, which brings convenience for circuit modelling and control loop design. However, due to the nature of multi-directional power flow, this PSM-based control strategy suffers from high circulating power in the tank, especially when the converter operates at high power rating, which results in high conduction loss and demanding hardware design.

To overcome the high current circulation issue, a combined phase shift—and—duty ratio power flow control strategy is proposed in the subject system.

The subject control methodology is capable of simultaneous charging of both HV and LV batteries from the power system AC grid. Moreover, it can achieve the functionalities, including grid to HV battery (G2H) charging, grid to LV battery (G2L) charging, HV battery to LV battery (H2L) charging, and vehicle to grid (V2G) discharging.

Figure 41:
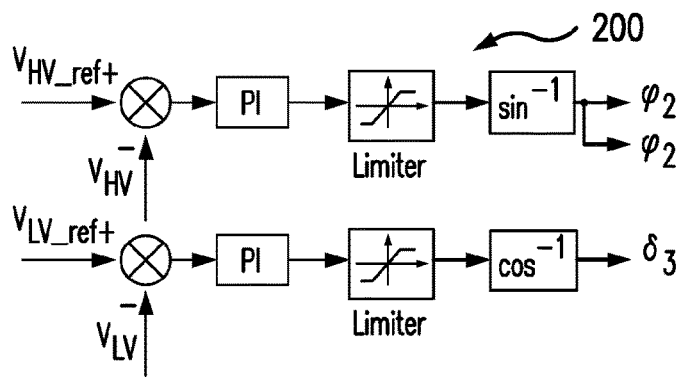
FIG. 41 is representative of the subject control loop configuration implemented with both phase shift-and-duty ratio control.
Figure 41:
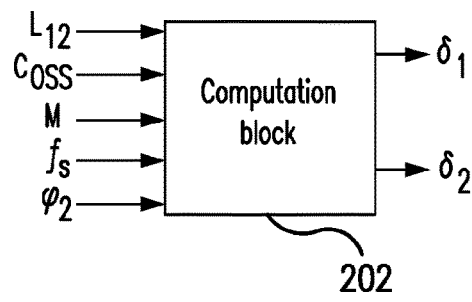

The subject control system 200 which has a three-loop structure is shown in FIGS. 26,27 and 41. In FIG. 41, $\varphi$ represents the phase shift control variable, and $\delta$ represents the duty ratio control variable. The control system 200 is implemented with both $\varphi$ and $\delta$ control functionality, and operates to achieve simultaneous charging while maintaining tight voltage regulations. The computation sub-system 202 provides a real time feedback for $\delta$ control.

Figure 42:
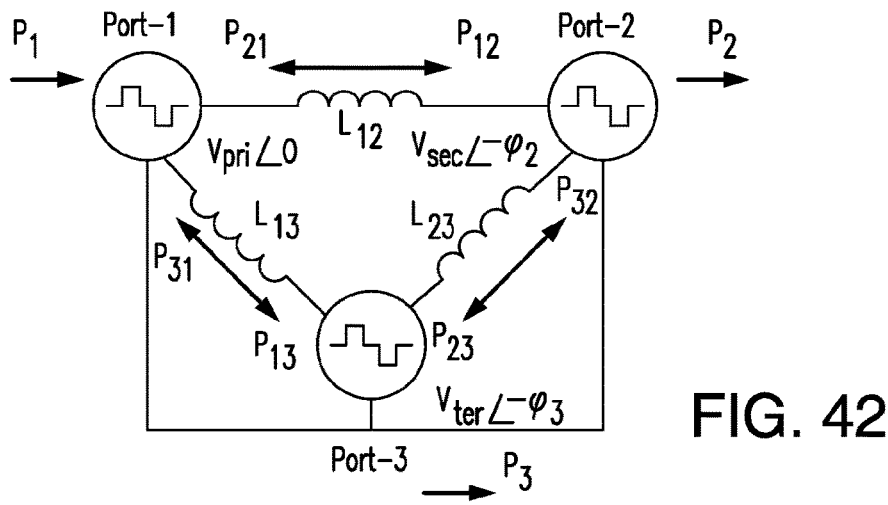
FIG. 42 is representative of the delta equivalent configuration of the TAB-based converter.

The topology of a TAB-based converter used in the subject OBC system 100, 102 is equivalent to the delta configuration, as shown in FIG. 42, where equivalent inductances are expressed as, $$\begin{cases} L_{12} = L_1 + L_2 + \dfrac{L_1 L_2}{L_3} \\ L_{23} = L_2 + L_3 + \dfrac{L_2 L_3}{L_1} \\ L_{13} = L_1 + L_3 + \dfrac{L_1 L_3}{L_2} \end{cases} \quad \text{(Eq. 23)}$$

where $L_1$, $L_2$ and $L_3$ are the primary, secondary and tertiary power inductors, respectively.

As shown in FIG. 42, both $P_{12}$ and $P_{32}$ involve the control variable $\varphi_2$, which implies that phase angle $\varphi_2$ can be used as a control variable for the port-2 output voltage regulation. To minimize the circulating active power, the modulus sum of power transferred between ports $P_1$, $P_2$, $P_3$ is to be minimized:

$$f(\delta_1, \delta_2, \delta_3, \varphi_1, \varphi_2, \varphi_3) = \text{Min}\{|P_{12}| + |P_{23}| + |P_{31}|\} \quad \text{(Eq. 24)}$$

A quick solution can be obtained by reducing one freedom of control variable:

$$\varphi_1 = 0, \; \varphi_2 = \varphi_3 \quad \text{(Eq. 25)}$$

Figure 43:
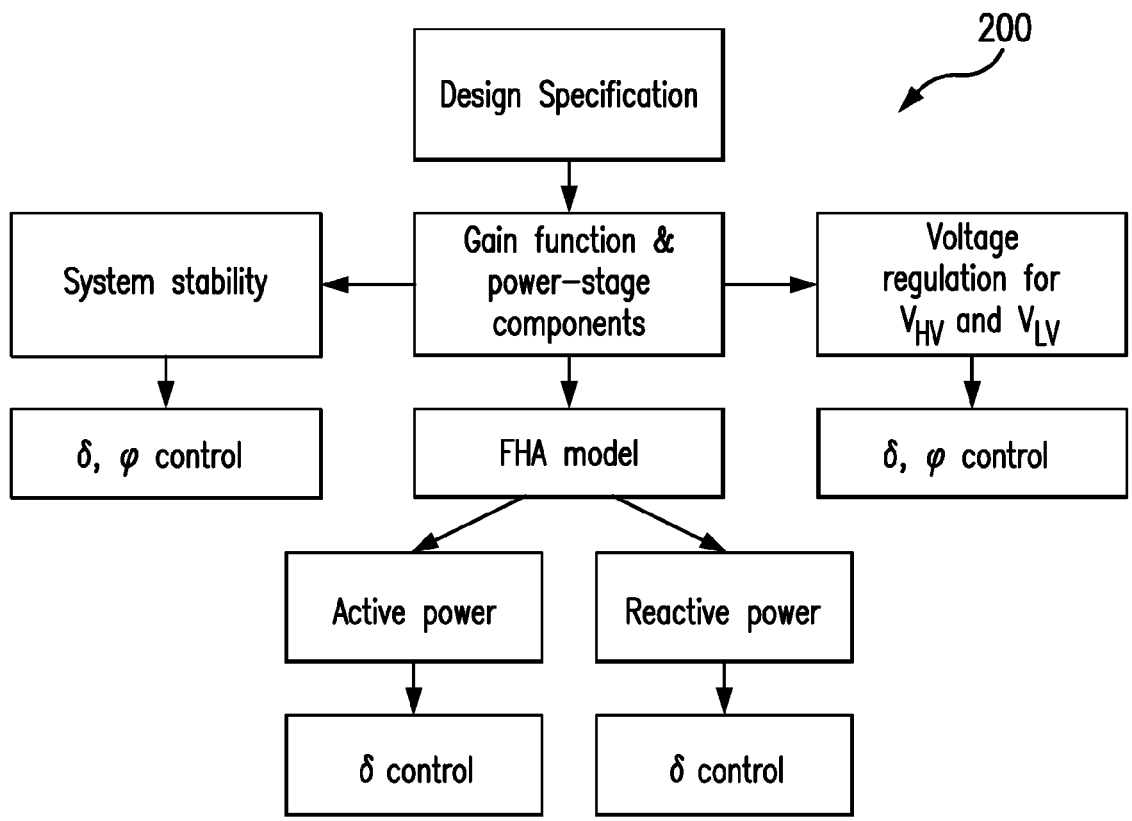
FIG. 43 is block-diagram of the subject control system adapted for the subject OBC.

There are some restrictions on the reactive power control. Because of the three-port structure, reactive power flows between ports $P_1$, $P_2$, $P_3$ are not inherently equal, which needs the boundary condition of $\delta$ control variable. $\varphi_1$ is set as 0 to obtain maximum power flow capability. By using $\varphi_2 = \varphi_3$, no circulating active power flows between port-2 and port-3. $\delta_3$ is utilized for the LV battery side voltage regulation. The control diagram for the subject control system 200 is expressed in FIG. 43.

It is important to note that the subject power flow control strategy is applicable both to the three-phase integrated charging system, and the single-phase, as well as to the subject OBC system using any number of phases and power levels.

Figure 44:
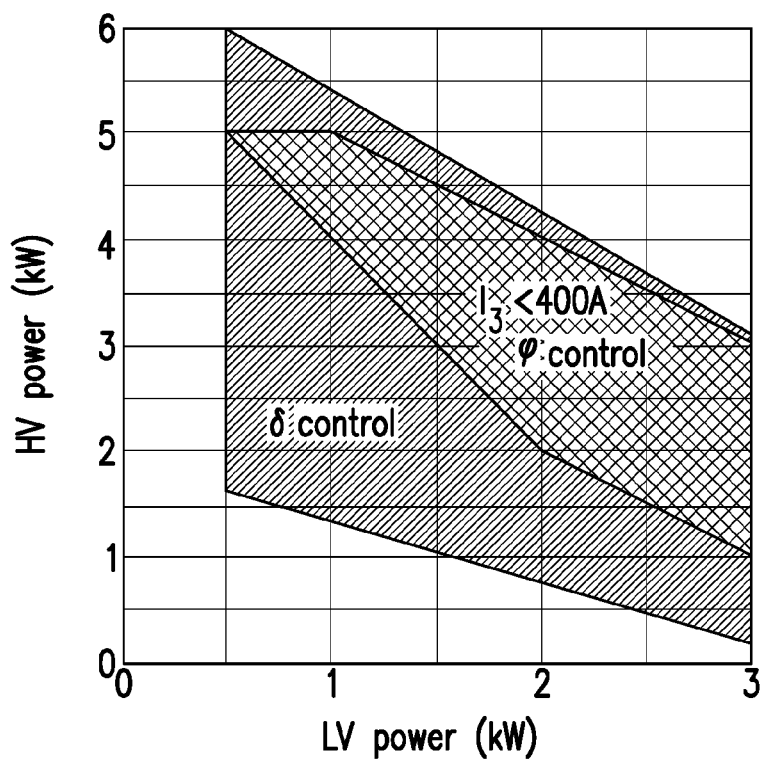
FIG. 44 is a diagram representative of the comparison of operation range between the phase shift $\varphi$ control and the duty ratio $\delta$ control.

FIG. 44 depicts a comparison result of the operation range between $\varphi$ control and $\delta$ control. As presented in FIG. 44, the $\delta$ control enables wide operation range of HV and LV batteries, especially under unbalanced loads condition.

Figure 45:
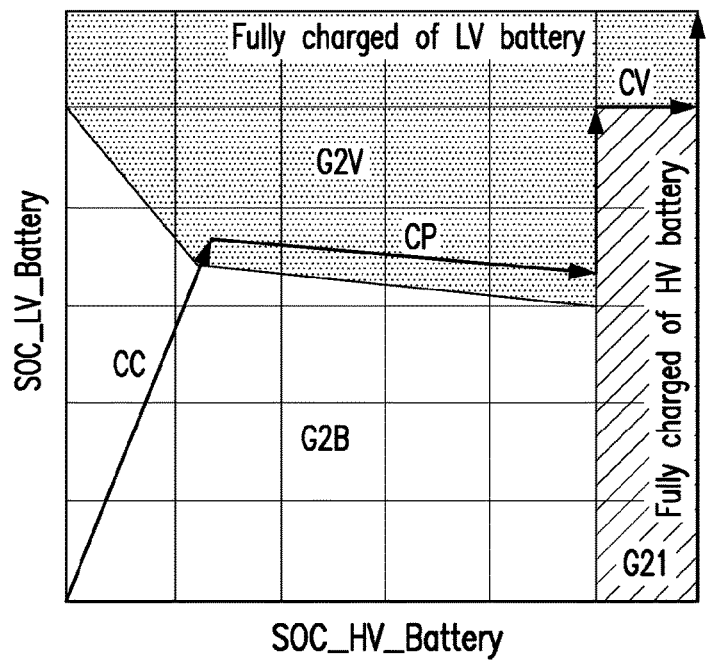
FIG. 45 is a diagram representative of the State-of-Charge SOC map.

The state-of-charge (SoC) map, shown in FIG. 45, describes the relation of charging modes (constant voltage (CV), constant current (CC), and constant power (CP)) and operation modes (G2B, G2V, G2L).

Figure 46:
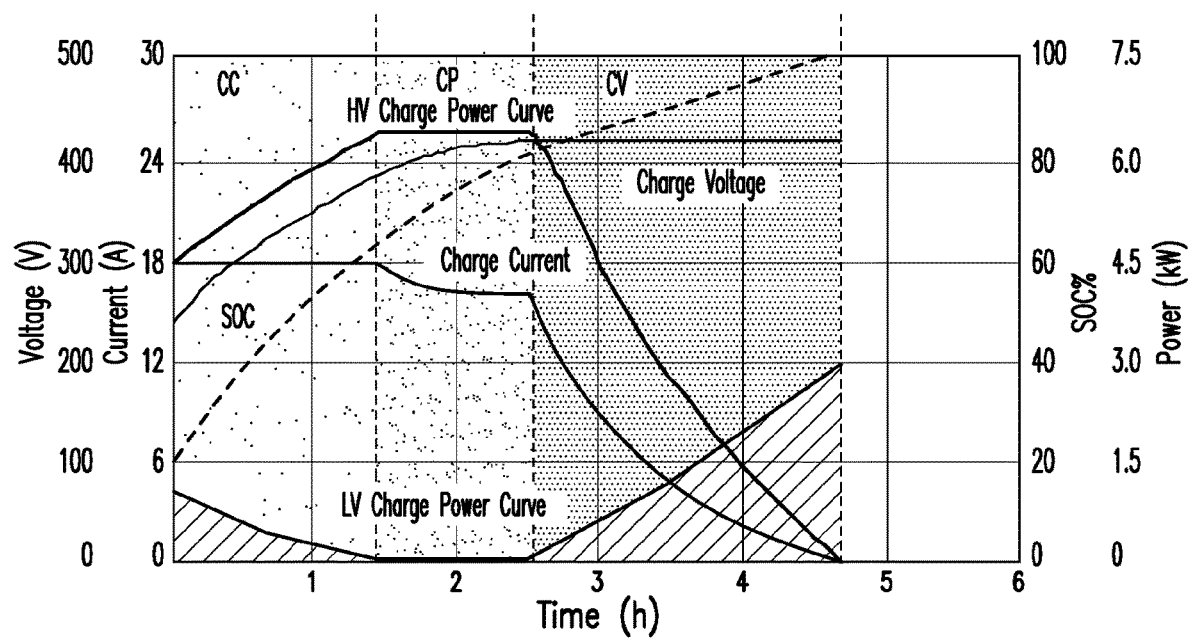
FIG. 46 is a diagram representative of the SOC mapping of the HV and LV batteries in the time domain.

A detailed SoC plot based on the subject control methodology in the time domain is illustrated in FIG. 46, where the LV charging power curve is determined by HV (high voltage) SoC curve.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of elements, steps, or processes may be reversed or interposed, all without departing from the spirit or scope of the invention as defined in the appended claims.

What is claimed is:

1. An on-board charger system for plug-in electric vehicles (PEVs), the on-board charger system comprising:
    an on-board charger (OBC) having an input port operatively coupled to an alternative current (AC) power grid, a first output port operatively coupled to a first battery, and a second output port operatively coupled to a second battery, wherein said OBC is configured for substantially simultaneous bi-directional power transfer between at least two of said input port, said first output port, and said second output port, respectively, wherein said OBC includes:
a transformer sub-system integrated therewith and operatively coupled, by a primary side thereof to said input port, and by a secondary side thereof, to said first output port and said second output port, and
a DC/DC converter integrated in said OBC and operatively coupled to said transformer sub-system,
wherein said DC/DC converter includes:
a first converter sub-system operatively coupled between said input port and said primary side of said transformer sub-system,
   a second converter sub-system operatively coupled between said secondary side of said transformer sub-system and said first output port, and
   a third converter sub-system operatively coupled between said secondary side of said transformer sub-system and said second output port; and
a power transfer control sub-system integrated with said OBC and operatively coupled to said input port and said first output port and said second output port for bi-directional regulated power transfer therebetween while maintaining predetermined voltage levels, said power transfer control sub-system being configured for a combined phase shift and duty ratio control at said input port and said first output port and said second output port in a resonant-based mode or a pulse-width-modulation based mode of operation.

2. The on-board charger system of claim 1, wherein said first converter sub-system, said second converter sub-system, and said third converter sub-system of said DC/DC converter, and said transformer sub-system form a triple active bridge (TAB) converter sub-system.

3. The on-board charger system of claim 1, wherein said OBC has a configuration selected from a group including a resonant-based configuration and a pulse-width modulation (PWM)-based configuration,
wherein each of said first converter sub-system and said second converter sub-system includes at least two MOSFET devices interconnected to form a half-bridge DC/DC converter circuit, or at least four MOSFET devices interconnected to form a full bridge DC-DC converter circuit, and wherein said third converter sub-system includes MOSFET devices interconnected to form a half-bridge DC/DC converter circuit, a full-bridge DC/DC converter circuit, or an active current doubler rectifier circuit.

4. The on-board charger system of claim 3, wherein in said resonance-based configuration, when each of said first converter sub-system and said second converter sub-system includes a half-bridge configuration, said OBC includes a resonant capacitor $C_1$ connected between said first converter sub-system and said primary side of said transformer sub-system, and a resonant capacitor $C_2$ connected between said secondary side of said transformer sub-system and said second converter sub-system.

5. The on-board charger of claim 3, wherein, in said resonance-based configuration, said OBC further includes resonance capacitors $C_1/2$ and $C_2/2$ included in a half-bridge configuration of each of said first converter sub-system and said second converter sub-system, said resonant capacitors $C_1/2$ and $C_2/2$ being coupled to said at least two MOSFET devices, and wherein in said PWM-based configuration, said DC/DC converter further includes a first shim inductor $L_1$ and a first DC-blocking capacitor $C_1$, each coupled between said first converter sub-system and said primary side of said transformer sub-system, a second shim inductor $L_2$, and a second DC-blocking capacitor $C_2$, each coupled between said secondary side of said transformer sub-system and said second converter sub-system, and a third inductor $L_3$ interconnected between said secondary side of said transformer sub-system and said third converter sub-system.

6. The on-board charger system of claim 3, further comprising a resonant inductor $L_1$ interconnected between said first converter sub-system and said primary end of said transformer sub-system, and a resonant inductor $L_2$ interconnected between said secondary side of said transformer sub-system and said second converter sub-system, said $L_1$ and $L_2$ enhancing power density of said DC/DC converter.

7. The on-board charger of claim 3, further including a switching sub-system coupled between said secondary side of said transformer sub-system and said third converter sub-system, said switching sub-system controlling a power flow during a grid-to-vehicle power transfer or a vehicle-to-grid power transfer.

8. The on-board charger of claim 7, further including a power interruption device coupled between said input port and said first converter sub-system, between said first converter sub-system and said primary side of said transformer sub-system, and at said primary side of said transformer sub-system.

9. The on-board charger system of claim 3, wherein said power transfer control sub-system operates in a mode of operation selected from a group consisting of:
a simultaneous charging mode of operation,
a reactive power flow optimization mode of operation, and
a synchronous rectification mode of operation;
wherein, in said simultaneous charging mode of operation, said first converter sub-system, said second converter sub-system, and said third converter sub-system are configured as full-bridge DC/DC converter circuits,
wherein a power flow towards the first and second output ports and the output voltage levels $V_1$, $V_2$, $V_3$ at said input port, and said first and second output ports, respectively, are controlled by independent control variables including duty rations $\delta_1$, $\delta_2$, $\delta_3$ of said full-bridge DC/DC converter circuits of said first, second and third converter sub-systems and phase angle differences $\varphi_1$ and $\varphi_2$, between fundamental voltage waveforms of said first and second and said first and third converter sub-systems, respectively,
wherein said first converter sub-system includes $Q_1$, $Q_2$, $Q_3$, $Q_4$ MOSFET devices,
said second converter sub-system includes $Q_5$, $Q_6$, $Q_7$, $Q_8$ MOSFET devices, and
said third converter sub-system includes $Q_9$, $Q_{10}$, $Q_{11}$, $Q_{12}$ MOSFET devices, and wherein
said power transfer control sub-system is a three-loop control structure independently controlling said control variables $\varphi_1$, $\varphi_2$, $\delta_1$, $\delta_2$, $\delta_3$ to generate gate pulses applied to said MOSFET devices in accordance with:
$Q_1$: delay=0;
$Q_3$: delay=$\pi 2 \delta_1$;
$Q_5$: delay=$\varphi_2+\delta_2-\delta_1$;
$Q_7$: delay=$\pi+\varphi_2-\delta_2-\delta_1$;
$Q_9$: delay=$\varphi_3+\delta_3-\delta_1$;
$Q_{11}$: delay=$\pi+\varphi_3-\delta_3-\delta_1$, and wherein MOSFET devices $Q_2$, $Q_4$, $Q_6$, and $Q_8$ are driven with gate pulses complimentary to gate pulses applied to said MOSFET devices $Q_1$, $Q_3$, $Q_5$, and $Q_7$, respectively.

10. The on-board charger system of claim 9, wherein, in said reactive power flow optimization mode of operation, said power transfer control sub-system generates said variables $\varphi_2$, $\varphi_3$, $\varphi_3$, sets $\delta_3=0$, and determines $\delta_1$ for ensuring a soft switching condition for said MOSFET devices.

11. The on-board charger of claim 10, wherein, in said synchronous rectifier mode of operation, said power transfer control sub-system includes:
   a PWM generator supplying a PWMA control signal to said first converter sub-system,
   a generalized harmonic computational sub-system computing a phase angle difference value $\theta_{SR}$ between the gate pulses for said first converter sub-system and said second converter sub-system required for synchronizing with a zero current crossing of a resonant current in said second converter sub-system,
   a delay computational sub-system coupled to said generalized harmonic computational sub-system receiving the PWMA control signal and said phase angle difference value $\theta_{SR}$ therefrom, and computing a gate signal PWMB based on said PWMA and $\theta_{SR}$,
   said delay computational sub-system supplying said gate signal PWMB to said second converter sub-system to attain a synchronous rectification in said first converter sub-system and said second converter sub-system, and
   wherein a synchronous rectification is incorporated in said MOSFET devices $Q_5$, $Q_6$, $Q_7$, and $Q_8$ of said second converter sub-system during a grid-to-vehicle mode of operation, and in said MOSFET devices $Q_1$, $Q_2$, $Q_3$, and $Q_4$ of said first converter sub-system during a vehicle-to-grid mode of operation.

12. A three-phase on-board charger (OBC) system for plug-in electric vehicles (PEVs), the three-phase OBC system comprising:
   a modular on-board charger (OBC) having an input port coupled to a three-phase alternative current (AC) power grid and a first output port and a second output port coupled to an on-board high voltage (HV) battery and an on-board low voltage (LV) battery, respectively,
   said modular OBC including a plurality of interconnected electronic modules and has a configuration selected from a group consisting of: a one-stage configuration and a two-stage configuration;
   wherein in said two-stage configuration, said modular OBC includes:
   a first electronic module operatively coupled between said input port and a DC link, said first electronic module including a bi-directional three-phase Power Factor Correction (PFC) rectifier sub-system,
   a second electronic module operatively coupled to a capacitor $C_{DC}$ of said DC link, said second electronic module including a plurality of MOSFET devices interconnected in a bridge sub-system,
   a third electronic module operatively coupled to said bridge sub-system, said third electronic module including an integrated transformer sub-system,
   a fourth electronic module operatively coupled between said integrated transformer sub-system and said first output port, wherein said fourth electronic module includes a rectifier sub-system for said on-board HV battery, said on-board HV battery being coupled to said fourth electronic module,
   a fifth electronic module operatively coupled between said integrated transformer sub-system and said second output port, wherein said fifth electronic module includes a rectifier sub-system for said on-board LV battery, said on-board LV battery being coupled to said fifth electronic module, and
   a control sub-system operatively coupled to said plurality of integrated electronic modules to implement a combined phase shift and duty ration based power flow control for charging said on-board HV battery and said on-board LV battery from the three-phase power AC grid, the on-board HV battery to the on-board LV battery charging, charging of the PEVs from the AC power grid, and discharging of the PEVs to the three-phase AC power grid; and
   wherein in said one-stage configuration, said modular OBC includes:
   a sixth electronic module operatively coupled to said input port, said sixth electronic module including a single-stage AC/DC converter sub-system, and
   said third electronic module operatively coupled to said sixth electronic module,
   said fourth electronic module and said fifth electronic module operatively coupled to said integrated transformer sub-system in said third electronic module, with said on-board HV battery and said on-board LV battery coupled to said first output port and said second output port, respectively, and
   said control sub-system operatively coupled to said plurality of integrated electronic modules.

13. The three-phase OBC system of claim 12, wherein, in said two-stage configuration, said bi-directional three-phase PFC rectifier sub-system of said first electronic module is selected from a group consisting of:
   three phase boost PFC rectifier, three-phase buck PFC rectifier, three-phase Vienna-type PFC rectifier, three single-phase buck PFC rectifier, and a modular multi-level converter,
   said bridge sub-system in said second electronic module is selected from a group consisting of:
   two full bridges connected in parallel,
   two half bridges connected in parallel,
   two individual half bridges,
   two individual full bridges,
   a three-phase bridge,
   three full bridges, and
   three half bridges;
   said transformer sub-system in said third electronic module is selected from a group consisting of:
   at least two separate transformers, at least two transformer sets with primary windings delta interconnected with capacitors and secondary windings interconnected in series with capacitors, and
   a single three-phase transformer;
   said rectifier sub-system of each of said fourth and fifth electronic modules, respectively, is selected, depending on the configuration of the transformer sub-system from a group consisting of:
   at least two half bridges,
   at least two full bridges,
   at least two half bridges connected in parallel,
   at least two full bridges connected in parallel; and
   wherein said DC Link is selected from a group consisting of:
   split DC Link, and
   non-split DC Link.

14. The three-phase OBC system of claim 12,
wherein in said one-stage configuration, said AC/DC converter of said sixth electronic module is selected from a group consisting of:
three single-phase AC-DC converters connected in parallel,
a Matrix-based three-phase AC-DC Triple Active Bridge (TAB) converter, and
a SWISS-based TAB converter with split AC capacitors;
wherein said transformer sub-system in said third electronic module is selected from a group consisting of:
at least two separate transformers,
three transformers with primary windings delta-interconnected with capacitors and secondary windings serially connected with capacitors, and
a single three-phase transformer; and
wherein said rectifier sub-system in said fourth and fifth electronic modules, respectively, is selected from a group consisting of:
at least two half bridges,
at least two full bridges,
at least two half bridges connected in parallel, and
at least two full bridges connected in parallel.

15. The there-phase OBC system of claim 12, wherein said control sub-system executes a pulse frequency modulation (PFM) or pulse width modulation (PWM).

16. The three-phase OBC system of claim 12, having a splitted power flow,
wherein said two-stage configuration includes:
a bi-directional three-phase PFC rectifier in said first electronic module,
two triple active full bridge converters connected in parallel in said second electronic module integrated with two transformers and six shim inductors of said third electronic module.

17. The three-phase OBC system of claim 12, having a splitted power flow,
further including a three-phase boost PFC rectifier in said first electronic module, and
two single-phase DC/DC converters in each of said fourth electronic module and said fifth electronic module, respectively, each single-phase DC/DC converter being integrated with a respective transformer sub-system in each split power flow.

18. The three-phase OBC system of claim 17, wherein said capacitor $C_{DC}$ of said DC link is split in two sub-capacitors.

19. The three-phase OBC system of claim 12, further including:
a three-phase boost PFC rectifier in said first electronic module, and
an integrated three-phase DC-DC converter in each of said fourth electronic module and said fifth electronic module.

20. The three-phase OBC system of claim 12, further including three single-phase H-bridge PFC rectifiers in said first electronic module integrated with triple active bridge (TAB) converters coupled in parallel.

* * * * *